United States Patent
Lee

(10) Patent No.: US 9,580,150 B2
(45) Date of Patent: Feb. 28, 2017

(54) SYSTEM AND METHOD FOR FUEL SAVINGS AND SAFE OPERATION OF MARINE STRUCTURE

(71) Applicant: CYTRONIQ., LTD., Cheonan (KR)

(72) Inventor: Michael MyungSub Lee, Seoul (KR)

(73) Assignee: CYTRONIQ CO., LTD., Cheonan, Chungcheongnam-do (KR)

( * ) Notice: Subject to any disclaimer, the term of this patent is extended or adjusted under 35 U.S.C. 154(b) by 0 days.

(21) Appl. No.: 14/555,928

(22) Filed: Nov. 28, 2014

(65) Prior Publication Data

US 2015/0088346 A1    Mar. 26, 2015

Related U.S. Application Data

(63) Continuation of application No. PCT/KR2013/004777, filed on May 30, 2013.

(30) Foreign Application Priority Data

May 30, 2012   (KR) .................. 10-2012-0057753
May 30, 2012   (KR) .................. 10-2012-0057754
(Continued)

(51) Int. Cl.
*G01N 25/72* (2006.01)
*G01M 3/00* (2006.01)
(Continued)

(52) U.S. Cl.
CPC .............. *B63B 9/002* (2013.01); *B63B 9/001* (2013.01); *B63B 9/02* (2013.01); *B63B 9/08* (2013.01);
(Continued)

(58) Field of Classification Search
USPC ............... 56/32; 701/21; 250/227.18, 231.1, 250/227.14; 374/E11.016, 130–131, 4–5;
(Continued)

(56) References Cited

U.S. PATENT DOCUMENTS 4,996,419 A * 2/1991 Morey ..................... 250/227.18
5,684,297 A * 11/1997 Tardy ....................... 250/227.14
(Continued)

FOREIGN PATENT DOCUMENTS

AU    2013268170 A1 * 1/2015
JP    2002-131022 A    5/2002
(Continued)

OTHER PUBLICATIONS

Large-scale experiments of a marine riser; David Murrin; Sue Molloy; Wei Qiu; Neil Bose; Martin Ordonez; Oceans 2008 Year: 2008; pp. 1-6, DOI: 10.1109/OCEANS.2008.5151969.*
(Continued)

*Primary Examiner* — Cuong H Nguyen
(74) *Attorney, Agent, or Firm* — Mintz Levin Cohn Ferris Glovsky and Popeo, P.C.; Kongsik Kim; Jonathon Western

(57) ABSTRACT

A system for monitoring a physical change of a marine structure includes a complex optical measuring instrument configured to detect a behavior and structural change of the marine structure by using at least one optical sensor by means of optical fiber Bragg grating.

21 Claims, 14 Drawing Sheets

(30) Foreign Application Priority Data

| | | | |
|---|---|---|---|
| May 30, 2012 | (KR) | ........................ | 10-2012-0057755 |
| Nov. 15, 2012 | (KR) | ........................ | 10-2012-0129441 |
| Dec. 20, 2012 | (KR) | ........................ | 10-2012-0149411 |
| Dec. 20, 2012 | (KR) | ........................ | 10-2012-0149412 |
| May 30, 2013 | (KR) | ........................ | 10-2013-0061477 |
| May 30, 2013 | (KR) | ........................ | 10-2013-0061754 |
| May 30, 2013 | (KR) | ........................ | 10-2013-0061759 |

(51) Int. Cl.

| | |
|---|---|
| *B63B 9/00* | (2006.01) |
| *B63B 9/08* | (2006.01) |
| *G01B 11/16* | (2006.01) |
| *G01L 1/24* | (2006.01) |
| *G01S 17/93* | (2006.01) |
| *G01S 13/86* | (2006.01) |
| *G01S 13/93* | (2006.01) |
| *E21B 17/01* | (2006.01) |
| *B63B 9/02* | (2006.01) |
| *B63J 99/00* | (2009.01) |
| *G01S 13/95* | (2006.01) |

(52) U.S. Cl.
CPC .............. *E21B 17/01* (2013.01); *G01B 11/16* (2013.01); *G01B 11/18* (2013.01); *G01L 1/246* (2013.01); *G01M 3/00* (2013.01); *G01S 13/865* (2013.01); *G01S 13/9307* (2013.01); *G01S 17/93* (2013.01); *B63B 9/003* (2013.01); *B63J 2099/008* (2013.01); *G01S 13/956* (2013.01); *Y02T 70/146* (2013.01)

(58) Field of Classification Search
USPC ............. 385/13; 382/12–13; 702/42; 356/32
See application file for complete search history.

(56) References Cited

U.S. PATENT DOCUMENTS

| | | | |
|---|---|---|---|
| 7,005,630 B2 * | 2/2006 | Shin et al. | ................ 250/227.18 |
| 7,310,154 B2 | 12/2007 | Kitaguchi et al. | |
| 9,400,227 B2 * | 7/2016 | Ramos | .................. G01M 3/002 |
| 2012/0170610 A1 * | 7/2012 | Ramos | .................. E21B 17/015 |
| | | | 374/5 |

FOREIGN PATENT DOCUMENTS

| | | |
|---|---|---|
| JP | 2007-121008 A | 5/2007 |
| KR | 10-2004-0065505 A | 7/2004 |
| KR | 10-2006-0018910 A | 3/2006 |
| WO | WO 2013180496 A3 * | 1/2014 |

OTHER PUBLICATIONS

High Mode Vortex Induced Vibration (VIV) Experiments on a Large-Scale Riser; David Murrin; Martin Ordonez; Gillian Stone; Neil Bose; Wei Qiu; Oceans 2007; Year: 2007; pp. 1-7, DOI: 10.1109/OCEANS.2007.4449235.*

Improved platform design;R. Haring; J. Hulett; B. Pearce; G. Pomonik; IEEE Journal of Oceanic Engineering; Year: 1978, vol. 3, Issue: 4; pp. 136-136, DOI: 10.1109/JOE.1978.1145395.*

Robust Particle Filters for Fatigue Crack Growth Estimation in Rotorcraft Structures; Mulugeta A. Haile; Jaret C. Riddick; Abey H. Assefa; IEEE Transactions on Reliability; Year: 2016, vol. 65, Issue: 3; pp. 1438-1448, DOI: 10.1109/TR.2016.2590258.*

Life prediction of fatigue crack propagation of cracked structure based on VCCTQin Qian; Chang-an Li; De Xie; Guo-qing Li Piezoelectricity, Acoustic Waves, and Device Applications (SPAWDA) and 2009 China Symposium on Frequency Control Technology, Joint Conference of the 2009 Symposium on; Year: 2009; pp. 53-53, DOI: 10.1109/SPAWDA.2009.5428.*

Pressurized Rescue Module System Hull and Transfer Skirt Design and Experimental Validation; C. Schoof; L. Goland; D. Lo Oceans 2007; Year: 2007; pp. 1-8, DOI: 10.1109/OCEANS.2007.4449295.*

* cited by examiner

| Incident Angle | Roll | Pitch | Aerodynamic Vector |
|---|---|---|---|
| 0 | 0 | 0 | Reference Data |
| 15 | 0 | 0 | Reference Data |
| 30 | 0 | 0 | Reference Data |
| 45 | 0 | 0 | Reference Data |
| : | : | : | Reference Data |

FIG. 12

| INDIVIDUAL STRUCTURE | LOCATION | COST | CONSUMED TIME | RESIDUAL LIFE |
|---|---|---|---|---|
| STERN | A | X | ONE DAY | ONE YEAR |
| STEM | B | Y | TWO DAYS | TWO YEARS |
| DECK | C | Z | THREE DAYS | THREE YEARS |
| . | . | . | . | . |
| . | . | . | . | . |
| . | . | . | . | . |
| . | . | . | . | . |

3D PRESSURE SENSOR

SYSTEM AND METHOD FOR FUEL SAVINGS AND SAFE OPERATION OF MARINE STRUCTURE

CROSS-REFERENCE TO RELATED APPLICATIONS

This application is a continuation of International Application No. PCT/KR2013/004777 filed on May 30, 2013, which claims priority to Korean Application No. 10-2012-0057753 filed on May 30, 2012, Korean Application No. 10-2012-0057754 filed on May 30, 2012, Korean Application No. 10-2012-0057755 filed on May 30, 2012, Korean Application No. 10-2012-0129441 filed on Nov. 15, 2012, Korean Application No. 10-2012-0149412 filed on Dec. 20, 2012, Korean Application No. 10-2012-0149411 filed on Dec. 20, 2012, Korean Application No. 10-2013-0061759 filed on May 30, 2013, Korean Application No. 10-2013-0061477 filed on May 30, 2013, and Korean Application No. 10-2013-0061754 filed on May 30, 2013. The applications are incorporated herein by reference.

TECHNICAL FIELD

The present disclosure relates to a system and method for monitoring physical changes of a marine structure in real time with a complex optical measuring instrument by using an optical sensor type measurement method. More particularly, the present disclosure relates to a system and method for monitoring physical changes of a marine structure in real time with a complex optical measuring instrument by using an optical sensor type measurement method.

In addition, the present disclosure also relates to real-time predictive monitoring and predictive controlling of aerodynamic and hydrodynamic environmental internal or external force, hull stresses, 6 degrees of freedom (6-dof) movement and location of a marine structure, and more particularly, to a method for synthetically measuring changes of four-directional slopes, sea gauge, trim, corrosion, erosion, crack, pressure, stress, vibration, frequency or the like applied to a floating marine structure by means of aerodynamic and hydrodynamic environmental internal or external force, and controlling the marine structure based thereon to provide information on fuel savings, safe operation and maintenance.

The present disclosure also relates to a method for controlling a structure (e.g., a marine/land structure, a ship-building structure, an aerospace structure, an underwater mooring structure, a fixed or wind/tide/wave-based structure or the like) by means of integral monitoring of environmental external forces.

BACKGROUND ART

Crude oil produced at a marine oil well is carried to a marine structure by using a pipeline which is a kind of a marine structure. The marine structure includes a floating production storage and offloading (FPSO), a tension-leg platform (TLP), a semi-submersible (SPAR), a fixe platform or the like.

At this time, the pipeline is installed in a deep sea as much as several kilometers to several hundred kilometers for the purpose of over 20-year operations.

In this case, the pipeline installed in a deep sea is shrunken or expanded by a temperature deviation over 100 degrees, and physical changes such as a length change occur due to a pressure change in the pipeline.

Accordingly, in the pipeline installed at the sea, stresses are intensively generated at a plurality of specific or unspecified points, which results in buckling or deformation. In addition, in a touch down zone where a pipeline installed at the seabed is connected to a riser serving as a marine carrier, the pipeline may pitch and roll due to a plurality of external environmental forces such as sea current, wave, tidal current, wind, temperature or the like.

In order to measure such pitch and roll, various kinds of monitoring methods are being used at the present. In an existing monitoring method, a deformation rate of the pipeline is measured by using an electric-type or optical fiber-type deformation sensor. In a marine structure, a welding portion is most vulnerable in a structural aspect, and thus sensors are installed and operated at intervals of 20 to 50 cm. Here, sensors are installed in a length direction of the pipeline to analyze deformation. In another monitoring method, an electric-type inclinometer is used to detect deformation of the pipeline.

However, such existing monitoring methods have difficulty in accurately analyzing situations since a deformation rate caused by temperature or pressure of a marine structure is much greater than a deformation rate caused by buckling or walking. In addition, an electric-type inclinometer currently used is installed in the sea and thus has problems such as loss by water leak caused by high hydraulic pressure and complexity in its power supply device and connection method, and thus a new measurement method allowing easier use is demanded. In addition, sensors used in the existing monitoring methods have short fatigue measurement durability life, and thus sensors useable for a longer time are needed.

During operation of a marine structure, fluid flow inevitably applies an internal or external force to the marine structure. Particularly, in case of a fixed marine structure mooring at a specific point on the sea, it is essential to control so that the internal or external force caused by such fluid flow is minimized.

In addition, during operation of a marine structure, aerodynamic and hydrodynamic environmental internal or external force and hull stresses may cause turnover of a ship or fall of cargos, and this problem should be solved urgently.

Meanwhile, it is an essence in the future marine shipbuilding industry to develop and build a marine structure having low fuel consumption. Assuming that marine structures consume 100 tons of fuel and exhaust 320 tons of carbon dioxide, if the fuel efficiency is improved by 1%, costs may be reduced over 240,000 dollars per year, about 6 million dollars for 24 years. In the used ship market, the fuel efficiency is one of the most important factors.

In addition, the modern society mostly depends on motorized transportation systems which exhaust greenhouse gas, but it is widely known that exhaustion of $CO_2$ is a main cause of global warming, climate change and ocean acidification. In view of the amount of $CO_2$ exhausted for transporting 1 ton of cargo by 1 mile, a marine structure is most efficient among all kinds of transportation means. However, since marine structures are overwhelming transportation means in the world trade, the amount of exhausted $CO_2$ by marine structures occupies about 3% in the entire greenhouse gas exhaustion. Therefore, if the fuel efficiency of marine structures is enhanced, the amount of exhausted greenhouse gas in the industry may be greatly reduced.

In addition, existing manual or semi-automated marine make a large difference in their operations due to the skill level of workers, and a system developed to use a semi-automation mode may be applied just to a corresponding marine structure. Therefore, in order to implement a system inclusively applied to various kinds of ships, a software engineering approach is required, and a software framework for providing a basis for developing similar kinds of applications should be developed.

SUMMARY

The present disclosure is designed to solve the problems of the related art, and therefore the present disclosure is directed to providing a method for fuel savings by real-time monitoring and controlling of aerodynamic and hydrodynamic environmental internal or external force, hull stresses, 6 degrees of freedom (6-doe movement and location of a marine structure.

In addition, the present disclosure is directed to providing a monitoring system and method which may allow long-term measurement of a change of a marine structure by using an optical sensor-type complex measurement, in comparison to an existing electric sensor-type measurement, and also ensure convenient installation and operation.

Moreover, the present disclosure is directed to providing an environment in which the monitoring information may be shared with another external device to enhance the accuracy of weather information, and data measured by satellites may be calibrated.

In addition, the present disclosure is directed to providing a method for real-time safe operation by measuring a change of four-directional slopes, sea gauge, trim or the like applied to a floating marine structure by means of aerodynamic and hydrodynamic environmental internal or external force, and then controlling the floating marine structure based on the measurement result.

Moreover, the present disclosure is directed to providing information on maintenance in real time by measuring corrosion, erosion, crack, pressure, stress or the like caused by aerodynamic and hydrodynamic environmental internal or external force applied to the marine structure.

The present disclosure is designed to solve the problems of the related art, and therefore the present disclosure is directed to providing a method for fuel savings by real-time monitoring and controlling of aerodynamic and hydrodynamic environmental internal or external force, hull stresses, 6-dof motion and location of a marine structure.

In addition, the present disclosure is directed to providing a monitoring system and method which may allow long-term measurement of a change of a marine structure by using an optical sensor-type complex measurement, in comparison to an existing electric sensor-type measurement, and also ensures convenient installation and operation.

Moreover, the present disclosure is directed to providing an environment in which the monitoring information may be shared with another external device to enhance the accuracy of weather information, and data measured by satellites may be calibrated.

In addition, the present disclosure is directed to providing a method for real-time safe operation by measuring a change of four-directional slopes, sea gauge, trim or the like applied to a floating marine structure by means of aerodynamic and hydrodynamic environmental internal or external force, and then controlling the floating marine structure based on the measurement result.

Moreover, the present disclosure is directed to providing information on maintenance in real time by measuring corrosion, erosion, crack, pressure, stress or the like caused by aerodynamic and hydrodynamic environmental internal or external force applied to the marine structure.

In one aspect of the present disclosure, there is provided a system for monitoring a physical change of a marine structure, which includes a complex optical measuring instrument configured to detect a behavior and structural change of the marine structure by using at least one optical sensor by means of optical fiber Bragg grating.

In addition, the complex optical measuring instrument may include an extensometer for measuring a distance change between at least one reference point set out of the marine structure and a point set on the marine structure by using the optical sensor, and the optical sensor may change a wavelength of the optical signal passing through the optical sensor according to a stress change applied to an optical fiber by the distance change.

The extensometer may include at least one wire for connecting the reference point and a point set on the marine structure. In addition, the wire may include an invar. In addition, the extensometer may further include a winding unit for winding the wire by a predetermined tension; and a sensing unit for measuring the number of revolutions of the winding unit by using an optical sensor. In addition, the extensometer may further include a stimulating unit for periodically stimulating the optical sensor according to the number of revolutions measured by the sensing unit.

In addition, according to another embodiment of the present disclosure, the complex optical measuring instrument may include an extensometer having an optical fiber wire 320 for connecting at least one point on the marine structure to measure a length change of the marine structure. The optical fiber wire 320 may change a wavelength of the optical signal passing through the optical fiber according to a stress change applied to an optical sensor due to a distance change on the marine structure.

In addition, according to another embodiment of the present disclosure, the extensometer may include at least one wire installed on the same point on the marine structure and made of an optical fiber, and the wire may change a wavelength of the optical signal passing through the optical fiber according to a stress change applied to an optical sensor due to a distance change on the marine structure.

In addition, according to another embodiment of the present disclosure, the extensometer may provide absolute location information of the point by calculating the degree of tension of each wire by means of the trigonometrical survey.

In addition, according to another embodiment of the present disclosure, the complex optical measuring instrument may include an inclinometer for measuring an angle change among a plurality of points on the marine structure by using the optical sensor. In addition, the inclinometer may include a weight installed in the gravity direction; and an optical sensor connected to the weight and having at least one optical fiber, and due to the angle change of the point on the marine structure where the inclinometer is installed, a wavelength of the optical signal passing through the optical fiber may be changed according to a stress change applied to the optical fiber by means of the weight.

In addition, according to another embodiment of the present disclosure, the complex optical measuring instrument may further include a seismometer for measuring a location change of the reference point. In addition, the complex optical measuring instrument may further include a vibration gauge for measuring a vibration of the marine structure.

In addition, according to another embodiment of the present disclosure, the system may further include a measurement device for detecting a change of the wavelength of the optical signal by the complex optical measuring instrument. The measurement device may be a data logger or an interrogator.

In addition, according to another embodiment of the present disclosure, the complex optical measuring instrument may detect a change of a target structure by using at least one of optical time-domain reflectometer (OTDR), Raman spectra (Raman), Brillouin scattering, Rayleigh wave, distributed acoustic sensing (DAS), acoustic emission, and interferometry.

In addition, according to another embodiment of the present disclosure, the measurement device may include an optical unit having a laser capable of controlling a wavelength; an optical referencing unit for distinguishing a wavelength of the optical signal reflected by the optical unit by means of each optical sensor; an optical coupler for connecting a plurality of optical fiber Bragg gratings of each optical sensor output from the optical referencing unit and distributing a Bragg reflection wavelength to each channel; and a photodiode for converting the Bragg reflection wavelength received from the optical coupler into an electric signal. In addition, the measurement device may have a function of collecting scattered optical signals.

Meanwhile, in another aspect of the present disclosure, there is also provided a method for monitoring a physical change of a marine structure, which includes (a) changing a wavelength or light quantity of the optical signal passing through an optical sensor according to a behavior or structural change of a marine structure by using at least one complex optical measuring instrument installed on the marine structure or a reference point; (b) by the complex optical measuring instrument, transmitting the optical signal having the changed wavelength or light quantity to the measurement device; and (c) by the measurement device, detecting a change of the wavelength or light quantity of the optical signal, wherein the complex optical measuring instrument includes at least one optical sensor using optical fiber Bragg grating.

In addition, according to another embodiment of the present disclosure, the complex optical measuring instrument may include an extensometer for measuring a distance change between at least one reference point set out of the marine structure and a point set on the marine structure.

In addition, according to another embodiment of the present disclosure, the extensometer may further include at least one wire connecting the reference point and a point set on the marine structure; a winding unit for winding the wire by a predetermined tension; a sensing unit for measuring the number of revolutions of the winding unit by using an optical sensor; and a stimulating unit for periodically stimulating the optical fiber according to the number of revolutions measured by the sensing unit.

In addition, according to another embodiment of the present disclosure, the extensometer may include an optical fiber wire for connecting at least one point on the marine structure to measure a length change of the marine structure, and the optical fiber wire may change a wavelength of the optical signal passing through the optical fiber according to a stress change due to a distance change on the marine structure.

In addition, according to another embodiment of the present disclosure, the extensometer may include at least one wire installed on the same point on the marine structure and made of an optical fiber, and the wire may change a wavelength of the optical signal passing through the optical fiber according to a stress change applied to the optical fiber due to a distance change on the marine structure.

In addition, according to another embodiment of the present disclosure, the extensometer may provide absolute location information of the point by calculating the degree of tension of each wire by means of the trigonometrical survey.

In addition, according to another embodiment of the present disclosure, the complex optical measuring instrument may include an inclinometer for measuring an angle change among a plurality of points on the marine structure by using the optical sensor. The inclinometer may include a weight installed in the gravity direction; and an optical sensor connected to the weight, and in the step (a), the weight may simulate the optical fiber according to an angle change occurring at the marine structure to generate a stress change, and the generated stress change is converted into an optical signal.

In addition, according to another embodiment of the present disclosure, the complex optical measuring instrument may further include a seismometer for measuring a location change of at least one reference point set out of the marine structure by using the optical sensor.

In addition, according to another embodiment of the present disclosure, the complex optical measuring instrument may further include a vibration gauge for measuring a vibration of the marine structure.

In addition, according to another embodiment of the present disclosure, the measurement device may use a data logger or an interrogator.

In addition, according to another embodiment of the present disclosure, the measurement device may include an optical unit having a laser capable of controlling a wavelength; an optical referencing unit for distinguishing a wavelength of the optical signal reflected by the optical unit by means of each optical sensor; an optical coupler for connecting a plurality of optical fiber Bragg gratings of each optical sensor output from the optical referencing unit and distributing a Bragg reflection wavelength to each channel; and a photodiode for converting the Bragg reflection wavelength received from the optical coupler into an electric signal.

Meanwhile, in another aspect of the present disclosure, there is also provided a controlling method by real-time monitoring of a physical change of a marine structure, which includes (a) obtaining data about a physical change of a marine structure through experiments at a water tank or a wind tunnel and accumulating the obtained data to generate a look-up table; (b) obtaining about an actual physical change of the marine structure, output from a measurement device; (c) comparing the data obtained in the step (b) with the data accumulated in the look-up table of the step (a) to generate forecasting data about the physical change of the marine structure; and (d) generating maintenance information including at least one of structure controlling operation information, maintenance-required location information, maintenance cost information and required maintenance time and alarm information about gas leak, fire or explosion by means of a three-dimensional numerical analysis program which receives the forecasting data, wherein the physical change includes at least one of a length change, an angle change, a temperature change, a pressure change and a specific volume change about at least one point on the marine structure.

In addition, according to another embodiment of the present disclosure, after the step (c), the method may further include (c-1) comparing the forecasting data with data about an actual physical change of the marine structure to correct the look-up table.

In addition, according to another embodiment of the present disclosure, after the step (d), the method may further include generating a simulator with the marine structure control information by means of a fluid structure interaction (FSI) program, and associating the simulator with the data about an actual physical change of the marine structure, obtained in the step (b), by means of context cognitive middleware to generate an algorithm for automatically controlling the marine structure.

In addition, according to another embodiment of the present disclosure, the three-dimensional numerical analysis program of the step (d) may use finite element method (FEM) and computational fluid dynamics (CFD).

In addition, according to another embodiment of the present disclosure, in the step (d), the three-dimensional numerical analysis program may be associated with a situation analysis module which stores virtual augmented reality data about information including gas leak, gas diffusion, fire or explosion, which probably occurs according to a behavior and structural change of the marine structure, and countermeasures against the virtual augmented reality data, to generate maintenance information.

In addition, according to another embodiment of the present disclosure, the method may further include (e) by an automatic structure control unit, controlling the marine structure by changing a location or angle of the marine structure according to the control operation information, and the automatic structure control unit may include a coupling unit connected to at least one point on the marine structure; and a displace adjusting unit connected to the coupling unit to move the marine structure in four directions.

In addition, the alarm information may be generated by using the data about an actual physical change of the marine structure, which is measured by the measurement device by using at least one of tunable diode laser absorption spectroscopy (TDLAS), distributed temperature sensing (DTS), distributed acoustic sensing (DAS), fiber Bragg grating (FBG) and remote methane leak detector (RMLD).

Meanwhile, in another aspect of the present disclosure, there is also provided a method for fuel savings and safe operation by real-time predictive monitoring and predictive controlling of aerodynamic environmental internal or external force, hull stresses, 6 degrees of freedom (6-dof) movement and location of a marine structure, the method including: (1) accumulating data about an internal or external force applied to a marine structure by a gas flow out of the marine structure by means of a linear test (e.g., hull form test) in a water tank or a wind tunnel and data about a response of the marine structure according to the internal or external force to generate a look-up table, and storing the look-up table in a database; (2) measuring the internal or external force by using a time-of-flight method in an actual voyage of the marine structure and storing the internal or external force in the database; (3) comparing the measurement data of the internal or external force obtained in the step (2) with the data about the internal or external force accumulated in the look-up table in the step (1) to predict data about a response of the marine structure; and (4) controlling a posture or navigation path of the marine structure in real time by using the predicted data about a response of the marine structure.

In addition, the step (3) may include (3-1) measuring an actual response of the marine structure; and (3-2) when the data about a response of the marine structure measured in the step (3-1) does not agree with the data about a response of the marine structure predicted in the step (3), correcting the data about a response of the marine structure stored in the look-up table generated in the step (1) into the data about a response of the marine structure measured in the step (3-1) or applying the corrected data to correct or supplement a numerical model.

In this case, the data about a response of the marine structure may be corrected by means of a simulator based on finite element analysis (FEA).

In addition, in the step (2), the internal or external force caused by gas may be measured by using a measurement instrument provided at the marine structure, and the measurement instrument may be an electric sensor or an optical sensor. In addition, the measurement instrument may measure wind direction, wind velocity, atmospheric pressure, temperature, humidity and dust at each altitude.

In addition, in the step (2), the internal or external force applied to the marine structure by a gas flow may be actually measured by using an internal measurement unit (IMU).

In addition, in the step (3), when the marine structure is a ship, the data about a response of the marine structure may include at least one selected from the group consisting of progress direction, four-directional slopes, sea gauge and trim of the ship.

In addition, in the step (3), when the marine structure is a temporarily fixed structure, the data about a response of the marine structure may include at least one selected from the group consisting of moving direction, four-directional slopes and sea gauge of the temporarily fixed structure.

In addition, in the step (2), data including natural frequency, harmonic frequency and gas characteristics of the marine structure by a gas flow may be measured.

In addition, in the step (1), the database storing the look-up table may be a voyage data recorder (VDR) provided at the marine structure.

In addition, when the marine structure is a temporarily fixed structure, the look-up table may be recorded as time sequential data by the year, and the look-up table may be corrected by comparing with time sequential data by the year which have been accumulated till the previous year.

In addition, in the step (4), the posture or navigation path of the marine structure may be controlled in real time by using at least one selected from the group consisting of a rudder, a thruster, a propeller, a sail, a kite and a balloon.

In addition, in the step (4), when the marine structure is a ship, a direction of a rudder or a RPM of a thruster or propeller may be controlled according to the data about a response of the marine structure so that a resultant force of a propelling force and the internal or external force has a targeted progress direction.

In addition, when the marine structure is a temporarily fixed structure, a thruster may be controlled according to the predicted data about a response of the marine structure so that a resultant force with the internal or external force is minimized to maintain a current location.

In addition, the marine structure may include a helideck, and in the step (4), a center of gravity of the marine structure may be changed by controlling a posture of the marine structure or adjusting an 6-dof angle by means of dynamic positioning (DP) or dynamic motioning (DM) so as to maintain a balance of the helideck or relieve a shock when a helicopter takes off or lands, and balanced state information of the helideck is stored in the database. In addition, the balanced state information of the helideck obtained by controlling a posture of the marine structure may be stored in the database, the database may transmit the balanced state information of the helideck to an external structure information server by means of a communication unit, and the structure information server may provide the helicopter with location information of a marine structure, which has the balanced state information of the helideck allowing taking-off or landing of a helicopter, among a plurality of marine structures.

In addition, the step (2) may further include (2-1) measuring at least one selected from the group consisting of wind direction, wind velocity, temperature, humidity, atmospheric pressure, solar radiant rays, inorganic ions, carbon dioxide, dust, radioactivity and ozone at a remote distance from the marine structure by using a measurement instrument, and storing the measurement data in the database.

Here, the measurement instrument may include at least one selected from the group consisting of an anemometer, a weathervane, a hygrometer, a thermometer, a barometer, a solarimeter, an atmospheric gassol automatic collector, a $CO_2$ flux measurement instrument, an atmospheric dust collector, an air sampler and an ozone analyzer.

In addition, the marine structure may include a ballast tank, and sloshing restraining units may be respectively provided at both sides of the ballast tank to reduce a sloshing phenomenon in the ballast tank. In addition, the sloshing restraining unit may restrain a sloshing phenomenon by decreasing an opening area of one horizontal section of the ballast tank.

In addition, in the step (4), ballast water loaded in the ballast tank may be moved in a direction opposite to a slope to control a posture of the marine structure. In addition, the ballast tank may include a barrier for partitioning an inside of the ballast tank, an opening/closing unit may be installed at the barrier to move the ballast water to another partition, and a pump may be installed in the opening/closing unit to control a moving speed and a moving direction of the ballast water.

In addition, the measurement data of the internal or external force obtained in the step (2) may be transmitted to an external weather information server, and the weather information server may store weather information correction data whose error is corrected by comparing weather information received from a satellite with the measurement data of the internal or external force.

In addition, the weather information correction data may be provided to an external user terminal which accesses the weather information server according to a request of the external user terminal.

Meanwhile, in another aspect of the present disclosure, there is also provided a method for providing maintenance information by real-time predictive monitoring of aerodynamic environmental internal or external force, hull stresses, 6-dof motion and location of a marine structure, the method including: (1) accumulating data about an internal or external force applied to a marine structure by a gas flow out of the marine structure by means of a linear test (e.g., hull form test) in a water tank or a wind tunnel and data about a response of the marine structure according to the internal or external force to generate a look-up table, and storing the look-up table in a database; (2) measuring the internal or external force by using a time-of-flight method in an actual voyage of the marine structure and storing the internal or external force in the database; (3) comparing the measurement data of the internal or external force obtained in the step (2) with the data about the internal or external force accumulated in the look-up table in the step (1) to predict data about a response of the marine structure; (3-1) measuring an actual response of the marine structure; (3-2) comparing the data about a response of the marine structure measured in the step (3-1) with the data about a response of the marine structure predicted in the step (3), and when the data about a response of the marine structure measured in the step (3-1) does not agree with the data about a response of the marine structure predicted in the step (3), correcting the data about a response of the marine structure stored in the look-up table generated in the step (1) into the data about a response of the marine structure measured in the step (3-1); and (4) obtaining maintenance data about the marine structure by performing virtual simulation to the data accumulated in the look-up table.

In addition, the data about a response of the marine structure may include at least one selected from the group consisting of strain, deformation, crack, vibration, frequency, corrosion, and erosion.

In addition, the maintenance data of the step (4) may be obtained distinguishably according to preset importance of individual structures provided at the marine structure.

In addition, the maintenance data may include at least one selected from the group consisting of maintenance-required location information, maintenance cost information, required maintenance time information and residual life information of each structure.

Meanwhile, in another aspect of the present disclosure, there is also provided a method for fuel savings and safe operation by real-time predictive monitoring and predictive controlling of hydrodynamic environmental internal or external force, hull stresses, 6-dof motion and location of a marine structure, the method including: (1) accumulating data about an internal or external force applied to a marine structure by a fluid flow out of the marine structure by means of a linear test (e.g., hull form test) in a water tank or a wind tunnel and data about a response of the marine structure according to the internal or external force to generate a look-up table, and storing the look-up table in a database; (2) measuring the internal or external force by using a time-of-flight method in an actual voyage of the marine structure and storing the internal or external force in the database; (3) comparing the measurement data of the internal or external force obtained in the step (2) with the data about the internal or external force accumulated in the look-up table to predict data about a response of the marine structure; and (4) controlling a posture or navigation path of the marine structure in real time by using the predicted data about a response of the marine structure.

In addition, the step (3) may include (3-1) measuring an actual response of the marine structure; and (3-2) when the data about a response of the marine structure measured in the step (3-1) does not agree with the data about a response of the marine structure predicted in the step (3), the data about a response of the marine structure stored in the look-up table generated in the step (1) is corrected into the data about a response of the marine structure measured in the step (3-1) or the corrected data is applied to correct or supplement a numerical model.

In this case, the data about a response of the marine structure may be corrected by means of a simulator based on a numerical model including computational fluid dynamics (CFD), finite element analysis (FEA), finite element method (FEM) and fluid structure interaction (FSI).

In addition, in the step (2), the internal or external force caused by fluid may be measured by using a measurement instrument provided at a side of the marine structure, and the measurement instrument may be an electric sensor or an optical sensor.

In addition, in the step (2), the internal or external force applied to the marine structure by a fluid flow may be actually measured by using an internal measurement unit (IMU).

In addition, in the step (3), when the marine structure is a ship, the data about a response of the marine structure may include at least one selected from the group consisting of progress direction, four-directional slopes, sea gauge and trim of the ship.

In addition, in the step (3), when the marine structure is a temporarily fixed structure, the data about a response of the marine structure may include at least one selected from the group consisting of moving direction, four-directional slopes and sea gauge of the temporarily fixed structure.

In addition, in the step (2), directions and velocities of a tidal current and a sea current according to space and time may be measured for each water level.

In addition, in the step (2), data including natural frequency, harmonic frequency and fluid characteristics of the marine structure by a fluid flow may be measured.

In addition, in the step (1), the database storing the look-up table may be a voyage data recorder (VDR) provided at the marine structure.

In addition, when the marine structure is a temporarily fixed structure, the look-up table may be recorded as time sequential data by the year, and the look-up table may be corrected by comparing with time sequential data by the year which have been accumulated till the previous year.

In addition, in the step (4), the posture or navigation path of the marine structure may be controlled in real time by using at least one selected from the group consisting of a rudder, a thruster, a propeller, a sail, a kite and a balloon.

In addition, in the step (4), when the marine structure is a ship, a direction of a rudder and RPM of a thruster and a propeller may be controlled according to the data about a response of the marine structure so that a resultant force of a propelling force and the internal or external force has a targeted progress direction.

In addition, when the marine structure is a temporarily fixed structure, a thruster may be controlled according to the predicted data about a response of the marine structure so that a resultant force of the internal or external force is minimized and the thruster maintains a current location.

In addition, the marine structure may include a helideck, and in the step (4), a center of gravity of the marine structure may be changed by controlling a posture of the marine structure or adjusting an 6-dof angle by means of dynamic positioning (DP) or dynamic motioning (DM) so as to maintain a balance of the helideck or relieve a shock when a helicopter takes off or lands. In addition, the balanced state information of the helideck according to the control of a posture of the marine structure may be stored in the database, the database may transmit the balanced state information of the helideck to an external structure information server by means of a communication unit, and the structure information server may provide location information of a marine structure, which has the balanced state information of the helideck allowing taking-off or landing of a helicopter, among a plurality of marine structures.

In addition, in the steps (1) and (2), the data about the internal or external force applied to the marine structure by a fluid flow may be data about vectors of a sea current and a tidal current, measured by a pressure sensor installed at a side of the marine structure.

In addition, there may be provided a plurality of pressure sensors installed at regular intervals at the side of the marine structure.

In addition, there may be provided a plurality of pressure sensors with different heights at the side of the marine structure, and the presence of measurement data obtained from the pressure sensors may be analyzed to obtain wave height data from data obtained from an uppermost pressure sensor.

In addition, among the plurality of pressure sensors, at least three pressure sensors may configure a three-dimensional pressure sensor module, and the three-dimensional pressure sensor module may obtain three-dimensional vector information of a sea current and a tidal current.

In addition, the step (2) may further include (2-1) measuring at least one selected from the group consisting of a wave intensity, a wave height, a wave cycle, a wave velocity and a wave direction at a remote distance from the marine structure by using a weather measurement instrument, and storing the measurement data in the database, and the weather measurement instrument may include at least one selected from the group consisting of a wave radar, a directional wave rider, a sea level monitor, an ultrasonic displacement sensor, an amemovane and an ultrasonic wave-height meter.

In addition, the step (2) may further include (2-1) measuring at least one selected from the group consisting of a wave intensity, a wave height, a wave cycle, a wave velocity and a wave direction at a remote distance from the marine structure by using a weather measurement instrument, and storing the measurement data in the database.

In addition, the marine structure may include a ballast tank, and sloshing restraining units may be respectively provided at both sides of the ballast tank to reduce a sloshing phenomenon in the ballast tank. In addition, the sloshing restraining unit may restrain a sloshing phenomenon by decreasing an opening area of one horizontal section of the ballast tank.

In addition, in the step (4), ballast water loaded in the ballast tank may be moved in a direction opposite to a slope to control a posture of the marine structure. In addition, the ballast tank may include a barrier for partitioning an inside of the ballast tank, and an opening/closing unit may be installed at the barrier to move the ballast water to another partition, and a pump may be installed in the opening/closing unit to control a moving speed and a moving direction of the ballast water.

In addition, the measurement data of the internal or external force obtained in the step (2) may be transmitted to an external weather information server, and the weather information server may store weather information correction data whose error is corrected by comparing weather information received from a satellite with the measurement data of the internal or external force.

In addition, the weather information correction data may be provided to an external user terminal which accesses the weather information server according to a request of the external user terminal.

Meanwhile, in another aspect of the present disclosure, there is also provided a method for providing maintenance information by real-time predictive monitoring of hydrodynamic environmental internal or external force, hull stresses, 6-dof motion and location of a marine structure, the method including: (1) accumulating data about an internal or external force applied to a marine structure by a fluid flow out of the marine structure by means of a linear test (e.g., hull form test) in a water tank or a wind tunnel and data about a response of the marine structure according to the internal or external force to generate a look-up table, and storing the look-up table in a database; (2) measuring the internal or external force by using a time-of-flight method in an actual voyage of the marine structure and storing the internal or external force in the database; (3) comparing the measurement data of the internal or external force obtained in the step (2) with the data about the internal or external force accumulated in the look-up table in the step (1) to predict data about a response of the marine structure; (3-1) measuring an actual response of the marine structure; (3-2) comparing the data about a response of the marine structure measured in the step (3-1) with the data about a response of the marine structure predicted in the step (3), and when the data about a response of the marine structure measured in the step (3-1) does not agree with the data about a response of the marine structure predicted in the step (3), correcting the data about a response of the marine structure stored in the look-up table generated in the step (1) into the data about a response of the marine structure measured in the step (3-1); and (4) obtaining maintenance data about the marine structure by performing virtual simulation to the data accumulated in the look-up table.

In addition, the data about a response of the marine structure may include at least one selected from the group consisting of strain, deformation, crack, vibration, frequency, corrosion, and erosion.

In addition, the maintenance data of the step (4) may be obtained distinguishably according to preset importance of individual structures provided at the marine structure.

In addition, the maintenance data may include at least one selected from the group consisting of maintenance-required location information, maintenance cost information, required maintenance time information and residual life information of each structure.

According to the present disclosure, by introducing an optical sensor-type measurement method, physical changes of a marine structure may be monitored accurately.

In addition, according to the present disclosure, it is possible to provide a monitoring system and method which may allow long-term stable measurement of a change of a marine structure by using an optical sensor-type complex measurement, in comparison to an existing electric sensor-type measurement, and also ensure convenient installation and operation.

Moreover, according to the present disclosure, since a marine structure may be instantly maintained and repaired by monitoring the marine structure in real time, costs required for operating the marine structure may be reduced.

In addition, according to the present disclosure, by monitoring a marine structure in real time, environmental pollution such as crude oil spill from the marine structure may be detected and prevented in advance.

According to the present disclosure, since aerodynamic and hydrodynamic environmental internal or external force, hull stresses, 6-dof motion and location of a marine structure which is voyaging or mooring may be monitored or controlled in real time, the fuel consumed while the marine structure is voyaging or mooring may be efficiently reduced.

In addition, by measuring a change of four-directional slopes, sea gauge, trim or the like applied to a floating marine structure by means of aerodynamic and hydrodynamic environmental internal or external force, the floating marine structure may be controlled safely.

Moreover, it is possible to provide an environment in which the monitoring information of the marine structure may be shared with another external device to enhance the accuracy of weather information, and the system may serve as a ground true station capable of calibrating data measured by satellites.

In addition, information monitored at the marine structure may be accumulated and utilized for study on sea level rises caused by global warming and global environments such as energy budget change.

Moreover, by maintaining a balance of a helideck installed at the marine structure, it is possible to give an environment which ensures rapid rescue using a helicopter at a marine accident.

In addition, weather information received from a satellite may be compared with measurement data of the internal or external force to decrease an error and then provided as basic data for forecast, thereby contributing to fishing industries.

Moreover, by providing information on maintenance according to corrosion, erosion, crack, pressure, stress or the like caused by aerodynamic and hydrodynamic environmental internal or external force applied to the marine structure, it is possible to extend a life span of the marine structure for longer-term operation.

In addition, by analyzing static or dynamic characteristics of a marine structure exposed to high-wave or strong-wind site conditions, it is possible to give important data when preparing a medium- and long-term plan to ensure long-term stability of the marine structure.

BRIEF DESCRIPTION OF DRAWINGS

FIG. 12 is a diagram showing maintenance data for a marine structure, which is schematized by means of simulation according to another embodiment of the present disclosure.

REFERENCE SYMBOLS

Figure 1:
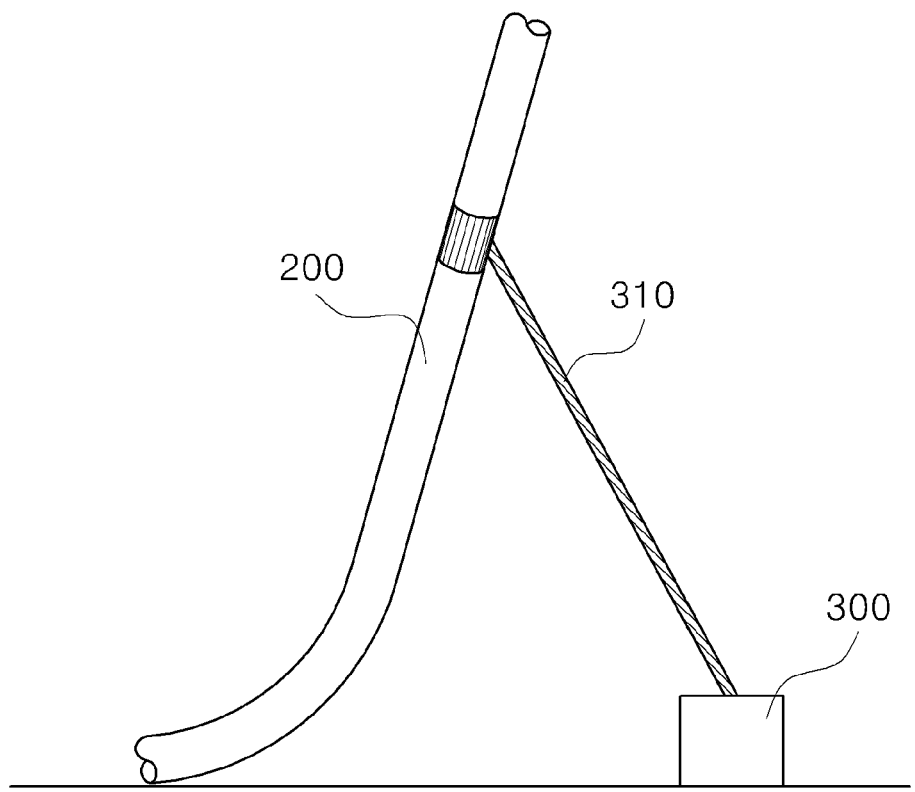
FIG. 1 is a diagram for illustrating a method for measuring a distance change between a reference point and a point set on a marine structure by using an extensometer connected to a pipeline at the seabed according to an embodiment of the present disclosure.

| | |
|---|---|
| 100: marine structure | 200: marine structure |
| 300: extensometer | 301: winding unit |
| 302: sensing unit | 303: stimulating unit |
| 304: optical sensor | 310: wire |
| 320: optical fiber wire | 400: automatic structure control unit |
| 410: coupling unit | 420: displace adjusting unit |
| 500: ballast tank | 510: sloshing restraining unit |
| 520: barrier | 530: opening/closing unit |
| 540: pump | |

DETAILED DESCRIPTION

Objects, technical configurations and resultant effects of the present disclosure will be clearly understood from the following detailed description based on drawings accompanied in the specification of the present disclosure. Embodiments of the present disclosure will be described in detail with reference to the accompanying drawings.

Embodiments disclosed in this specification should not be interpreted or used as limiting the scope of the present disclosure. It is obvious to those skilled in the art that the descriptions including embodiments have various applications. Therefore, unless it is limited by the claims, the following embodiments are just examples for better understanding of the present disclosure and are not intended to limit the scope of the present disclosure.

The term "marine structure" used in the present disclosure has a wide meaning including all kinds of marine or submersible structures, for example, jack-up rigs, semi-sub rigs, jackets, compliant towers, TLP, floating petroleum production, storing or extracting facilities, wind power generators and wave energy converters as well as directly or indirectly associated complex structures (e.g., non-subsea structures/flare towers, top-side), berthing-related marine structures, drill rigs, production casings for collecting oil and gas at an oilfield, flow lines, production lines, mooring lines, hawser lines, lowering lines, tethering cable lines for ROV, structure supports and connection cables of sails for environment-friendly fuel savings, tensioners having an optical fiber embedded therein, blades and towers of a wind power generator, jackets, tensioners inserted into a foundation, bridge/cable-stayed bridge cables, structures such as on-water, in-water or under-water supports, and concrete tensioners for such structures. In addition, the term "marine structure" includes coupled risers and un-coupled risers. The coupled riser includes steel catenary risers (SCRs), weight-distributed SCRs, steel lazy wave risers (SLWRs), flexible riser systems or the like, and the un-coupled riser includes single hybrid riser towers, grouped SLOR, hybrid riser towers, buoyancy supported risers (commonly known as a BSR system) or the like.

1. Mathematical models include computational fluid dynamics (CFD), finite element method (FEM), fluid structure interaction (FSI), finite difference method, finite volume method, inverse finite element method (iFEM), and inverse finite element analysis.

2. Wind, wave and current loads are calculated by means of computational fluid dynamics (CFD).

3. A look-up table for wind, wave and current load response for fluid structure interaction (FSI) and context cognitive information is calculated.

4. Self-learning predictive monitoring and controlling, dynamic monitoring system (DMS)/dynamic positioning system (DPS)/energy efficiency operational indicator (EEOI)/energy efficiency design index (EEDI) are accomplished by an artificial intelligence.

4-0-a. Dynamic positioning (DP) or dynamic motion (DM) boundary and priority orders of target structures are applied to among individual or complex structures to minimize a fatigue, and helicopter taking-off or landing, a separator, and a liquefying process are stabilized by means of DMS.

4-0-b. when control is made to satisfy EEOI/EEDI conditions, priority orders are applied to target structures among individual or complex structures to determine a fatigue minimization priority order, the structures are operated to ensure maximum control efficiency of DPS, DMS or EEOI, and quantitative EEDI is measured.

4-1. Calibrating numerical analysis with empirical data and evolving and/or defining a specific algorithm (the artificial Intelligence) with NA (e.g., CFD/FEM/FSI) is performed in real time or as post-processing.

4-2. Diagnosis (e.g., diagnosis of a motion size, a fatigue of periodic correlation, a tension generated by deformation, displacement or location change, or posture of a marine structure, or a fatigue accumulated therefrom) is performed in real time or as post-processing, and prognostic analysis is made based on the accumulated results.

4-3. Referring to core technique development of predictive maintenance for optimal operation and maintenance of marine plants, a large amount of sensor data are processed and analyzed in real time for situation diagnosis and prognosis.

The term 'optical sensor' used in this specification means a sensor for estimating a measured value by using intensity of light passing through an optical fiber, refractive index, length or mode of the optical fiber, change of polarization state, or the like. In addition, a measurement value of the optical sensor is diverse, for example as temperature, pressure, strain, rotation rate or the like, and the optical sensor uses substantially no electricity and has substantially no limit in its use environment due to excellent corrosion resistance of silica material.

In addition, the term 'Bragg grating' used in this specification means a refractive index variation pattern generated by changing an optical refractive index according to the degree of exposure when an optical fiber is exposed to ultraviolet rays for a predetermined time. In addition, since an optical Bragg grating selectively reflects or eliminates light of a specific wavelength according to a variation period of the refractive index, the optical Bragg grating may be used for optical communication filters, optical distribution compensators, optical fiber laser or the like. In addition, by using the change of light selectivity according to an external tensile force or temperature change, the optical Bragg grating is also widely applied as an optical sensor.

In addition, the term 'extensometer' used in this specification generally means a device for accurately changing a change of target distance, namely an elongation, and the term 'inclinometer, used in this specification generally means a device for measuring a change of angle generated at a measurement target.

In addition, the term 'numerical analysis' used in this specification means an analyzing method for numerically investigating a deformation behavior by modeling a structure form or actual model with a computer program so that various variables such as stress applied thereto are used as input data and displace and stress states are used as output data, and this is an inclusive term including computational fluid dynamics, finite element method (FEM), fluid structure interaction (FSI), finite difference method (FDM), finite volume method (FVM), inverse finite element method (IFEM) or the like.

In addition, the term 'finite element method (FEM)' used in this specification means a numerical calculation method for dividing a continuous structure into a finite number of elements having a one-directional rod, two-directional triangle or rectangle, or three-dimensional solid body (a tetrahedron or a hexahedron) and performing an approximation solution based on energy principles to each region.

In addition, the term 'computational fluid dynamics (CFD)' used in this specification means to calculate a dynamic motion of fluid or gas in a numerical analysis method by using a computer.

The present disclosure is directed to a system and method for measuring a buckling or walking phenomenon of a marine structure by using an optical fiber and monitoring a physical change of the marine structure accordingly, and the present disclosure uses a complex optical measuring instrument including an extensometer capable of measuring a distance change from a reference point at each location set on the marine structure, an inclinometer capable of measuring a change direction at each location set on the marine structure, or a seismometer capable of detecting a change of a reference point. In addition, a thermometer, a flow meter and a manometer may be included.

The present disclosure provides a system for monitoring a physical change of a marine structure, which includes a complex optical measuring instrument for detecting a behavior and a structural change of the marine structure by using at least one optical sensor having an optical fiber.

In addition, the complex optical measuring instrument includes an extensometer for measuring a distance change between at least one reference point set out of the marine structure and a point set on the marine structure by using the optical sensor, and the optical sensor changes a wavelength of the optical signal passing through the optical sensor according to a stress change applied to the optical fiber due to the distance change.

Referring to FIG. 1, the extensometer includes at least one wire for connecting the reference point and a point set on the marine structure. The wire may be fabricated as a tapeline made of invar which is an alloy having a low thermal expansion coefficient by adding 36.5% of nickel to 63.5% of iron. By using an invar wire, the extensometer is used for measuring a distance with high accuracy without being affected by an external temperature change.

Figure 2:
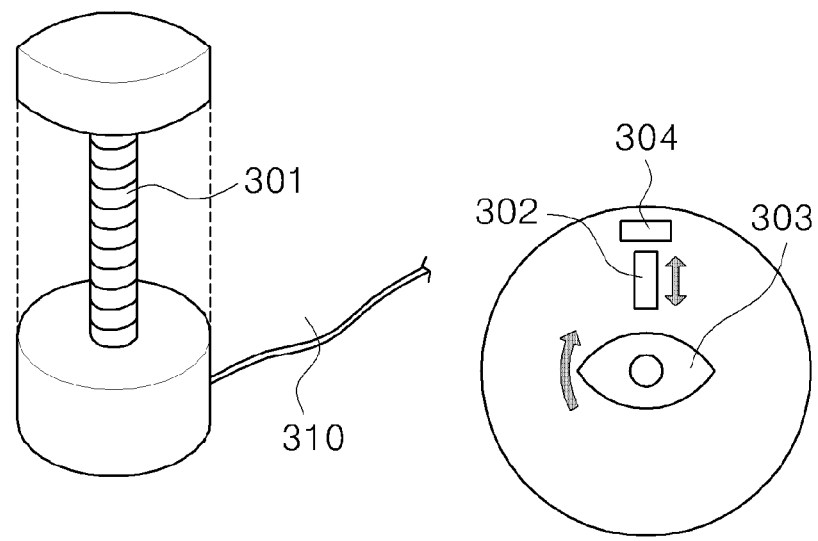
FIG. 2 is a diagram showing a structure of an extensometer according to another embodiment of the present disclosure.

In addition, referring to FIG. 2, the extensometer may further include a winding unit for winding the wire by a predetermined tension and a sensing unit for measuring the number of revolutions of the winding unit by using the optical sensor. In addition, the extensometer may further include a stimulating unit for periodically stimulating the optical sensor according to the number of revolutions measured by the sensing unit.

Figure 3:
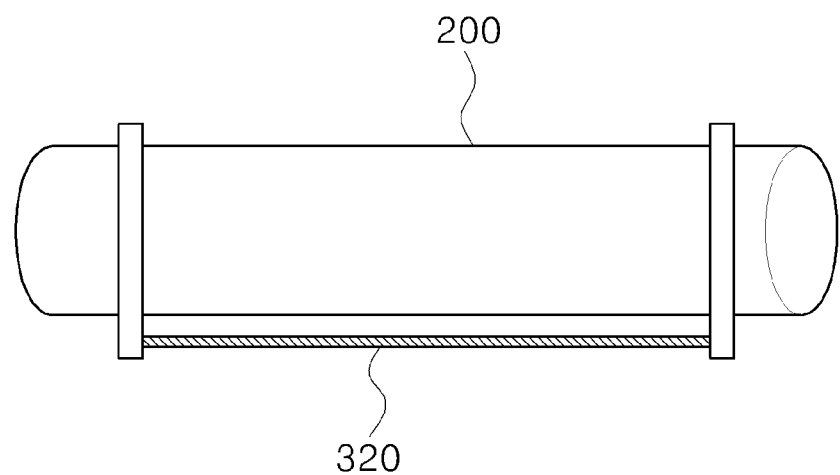
FIG. 3 is a diagram showing an extensometer for measuring a length change of a marine structure by providing an optical fiber wire which connects at least two points on the marine structure according to another embodiment of the present disclosure.

In addition, another embodiment of the present disclosure will be described with reference to FIG. 3. Here, the complex optical measuring instrument includes an extensometer having an optical fiber wire connecting at least one point on the marine structure to measure a length change of the marine structure. The optical fiber wire changes a wavelength of the optical signal passing through the optical sensor according to a stress change applied to the optical fiber due to the distance change on the marine structure.

Figure 4:
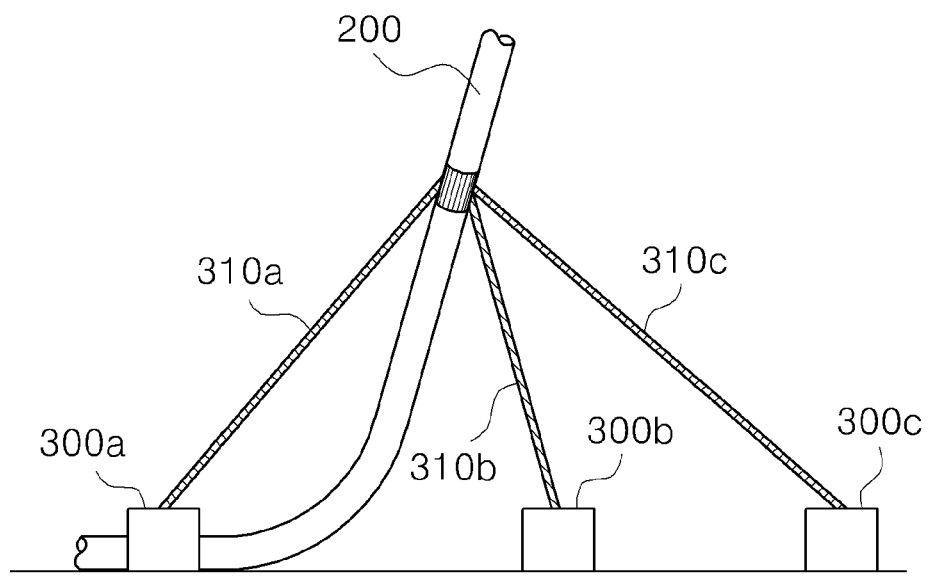
FIG. 4 is a diagram for illustrating a method for measuring a length change of the marine structure by means of trigonometrical survey by using an extensometer according to another embodiment of the present disclosure.

In addition, another embodiment of the present disclosure will be described with reference to FIG. 4. Here, the extensometer includes at least one wire installed at the same point on the structure and made of an optical fiber, and the wire changes a wavelength of the optical signal passing through the optical sensor according to a stress change applied to the optical fiber due to the distance change on the marine structure.

In addition, according to another embodiment of the present disclosure, the extensometer calculates the degree of tension of each wire by means of the trigonometrical survey and provides absolute location information of the point. Here, the trigonometrical survey means a method for finding a coordinate and a distance of a point by using properties of a triangle. If this point is given together with two reference points, in a triangle formed by the point and two reference points, angles formed by a bottom side and other two sides are respectively measured, a length of the bottom side is measured, and then a series of calculations are performed by using a sine law to find a coordinate and a distance of the point.

In addition, according to another embodiment of the present disclosure, the complex optical measuring instrument includes an inclinometer for measuring an angle change between plural points on the marine structure by using the optical sensor. In addition, the inclinometer includes a weight installed in the gravity direction, and an optical sensor connected to the weight and having at least one optical fiber, and due to the angle change of the point on the marine structure where the inclinometer is installed, a wavelength of the optical signal passing through the optical fiber is changed according to a stress change applied to the optical fiber by means of the weight.

In addition, according to another embodiment of the present disclosure, the complex optical measuring instrument may further include a seismometer for measuring a location change of the reference point. Moreover, the complex optical measuring instrument may further include a vibration gauge for measuring a vibration of the marine structure.

In addition, according to another embodiment of the present disclosure, a measurement device for detecting a change of the wavelength of the optical signal by the complex optical measuring instrument may be further included. A data logger or an interrogator may be used as the measurement device.

In addition, according to another embodiment of the present disclosure, the complex optical measuring instrument detects a change of a target structure by using at least one of optical time-domain reflectometer (OTDR), Raman spectra (Raman), Brillouin scattering, Rayleigh wave, distributed acoustic sensing (DAS), acoustic emission, and interferometry In addition, according to another embodiment of the present disclosure, the measurement device may include an optical unit having a laser capable of controlling a wavelength, an optical referencing unit for distinguishing a wavelength of the optical signal reflected by the optical unit by means of each optical sensor, an optical coupler for connecting a plurality of optical fiber Bragg gratings of each optical sensor output from the optical referencing unit and distributing a Bragg reflection wavelength to each channel, and a photodiode for converting the Bragg reflection wavelength received from the optical coupler into an electric signal. Moreover, the measurement device may have a function of collecting scattered optical signals.

The extensometer measures an amount of behavior of the marine structure by detecting a length change between points set on the marine structure, and the inclinometer measures an angle change by detecting a direction of the behavior of the marine structure. The measured result is transferred to the measurement device by using a wired/wireless electric, electronic, sonar or optical communication method.

In order to measure buckling which is macroscopically generated over a several ten meters or several hundred meters in a direction horizontal to the seabed surface, a plurality of extensometers and inclinometers are provided to monitor a physical change of the marine structure.

If it is difficult to install a reference point at the seabed, extensometers are installed at intervals of 90 degrees, and an angle change is monitored by using an inclinometer to monitor a physical change of the marine structure.

An extensometer capable of measuring a length change from the reference point and an inclinometer capable of measuring an angle change are provided. At the reference point, a seismometer capable of measuring movement of the ground may be further installed, and an optical measurement device for receiving an optical signal from the inclinometer and the extensometer is also provided. The output from the measurement device is transmitted by using at least one of wired/wireless electric, electronic, sonar or optical communication methods so as to be checked on the sea or remotely. In addition, a plurality of extensometers or inclinometers may be used.

In addition, at the reference point, a capable of measuring movement of the ground may be further installed, and an optical measurement device for receiving an optical signal from the inclinometer and the extensometer is also provided. The output from the measurement device is transmitted by using at least one of wired/wireless electric, electronic, sonar or optical communication methods so as to be checked on the sea or remotely. In addition, a plurality of extensometers or inclinometers may be used.

Meanwhile, a method for monitoring a physical change of a marine structure according to an embodiment of the present disclosure includes (a) changing a wavelength and/or light quantity of the optical signal passing through an optical sensor according to a behavior or structural change of a marine structure by using at least one complex optical measuring instrument installed on the marine structure or at a reference point, (b) by the complex optical measuring instrument, transmitting the optical signal having the changed wavelength and/or light quantity to the measurement device, and (c) by the measurement device, detecting a change of the wavelength and/or light quantity of the optical signal, and the complex optical measuring instrument includes at least one optical sensor using optical fiber Bragg grating.

In addition, another embodiment of the present disclosure will be described with reference to FIG. 1. Here, the complex optical measuring instrument may include an extensometer for measuring a distance change between at least one reference point set out of the marine structure and a point set on the marine structure.

In addition, another embodiment of the present disclosure will be described with reference to FIG. 2. Here, the extensometer includes at least one wire connecting the reference point and a point set on the marine structure, a winding unit for winding the wire by a predetermined tension, a sensing unit for measuring the number of revolutions of the winding unit by using an optical sensor, and a stimulating unit for periodically stimulating the optical fiber according to the number of revolutions measured by the sensing unit.

In addition, another embodiment of the present disclosure will be described with reference to FIG. 3. Here, the extensometer includes an optical fiber wire 320 for connecting at least one point on the marine structure to measure a length change of the marine structure, and the optical fiber wire 320 changes a wavelength of the optical signal passing through the optical fiber according to a stress change due to a distance change on the marine structure.

In addition, another embodiment of the present disclosure will be described with reference to FIG. 4. Here, the extensometer includes at least one wire installed on the same point on the marine structure and made of an optical fiber, and the wire changes a wavelength of the optical signal passing through the optical fiber according to a stress change applied to the optical fiber due to a distance change on the marine structure.

In addition, according to another embodiment of the present disclosure, the extensometer provides absolute location information of the point by calculating the degree of tension of each wire by means of the trigonometrical survey.

In addition, according to another embodiment of the present disclosure, the complex optical measuring instrument includes an inclinometer for measuring an angle change among a plurality of points on the marine structure by using the optical sensor. The inclinometer includes a weight installed in the gravity direction and an optical sensor connected to the weight, and the weight simulates the optical fiber according to an angle change occurring at the marine structure to generate a stress change, and the generated stress change is converted into an optical signal.

In addition, according to another embodiment of the present disclosure, the complex optical measuring instrument further includes a seismometer for measuring a location change of at least one reference point set out of the marine structure by using the optical sensor.

In addition, according to another embodiment of the present disclosure, the complex optical measuring instrument further includes a vibration gauge for measuring a vibration of the marine structure.

In addition, according to another embodiment of the present disclosure, the measurement device may use a data logger or an interrogator.

In addition, according to another embodiment of the present disclosure, the measurement device may include an optical unit having a laser capable of controlling a wavelength, an optical referencing unit for distinguishing a wavelength of the optical signal reflected by the optical unit by means of each optical sensor, an optical coupler for connecting a plurality of optical fiber Bragg gratings of each optical sensor output from the optical referencing unit and distributing a Bragg reflection wavelength to each channel, and a photodiode for converting the Bragg reflection wavelength received from the optical coupler into an electric signal.

Meanwhile, in another aspect, a controlling method by real-time monitoring of a physical change of a marine structure includes (a) obtaining data about a physical change of a marine structure through experiments at a water tank or a wind tunnel and accumulating the obtained data to generate a look-up table, (b) obtaining about an actual physical change of the marine structure, output from a measurement device, (c) comparing the data obtained in the step (b) with the data accumulated in the look-up table of the step (a) to generate forecasting data about the physical change of the marine structure, and (d) generating maintenance information including at least one of structure controlling operation information, maintenance-required location information, maintenance cost information and required maintenance time and alarm information about gas leak, fire or explosion by means of a three-dimensional numerical analysis program which receives the forecasting data, and the physical change includes at least one of a length change, an angle change, a temperature change, a pressure change and a specific volume change about at least one point on the marine structure.

In addition, according to another embodiment of the present disclosure, after the step (c), the method further includes (c-1) comparing the forecasting data with data about an actual physical change of the marine structure to correct the look-up table.

In addition, according to another embodiment of the present disclosure, after the step (d), the method further includes generating a simulator with the marine structure control information by means of a fluid structure interaction (FSI) program, and associating the simulator with the data about an actual physical change of the marine structure, obtained in the step (b), by means of context cognitive middleware to generate an algorithm for automatically controlling the marine structure.

In addition, according to another embodiment of the present disclosure, the three-dimensional numerical analysis program of the step (d) may use finite element method (FEM) and computational fluid dynamics (CFD).

In addition, according to another embodiment of the present disclosure, in the step (d), the three-dimensional numerical analysis program may be associated with a situation analysis module which stores virtual augmented reality data about information such as gas leak, gas diffusion, fire or explosion, which probably occurs according to a behavior and structural change of the marine structure, and countermeasures against the virtual augmented reality data, to generate maintenance information.

Figure 5:
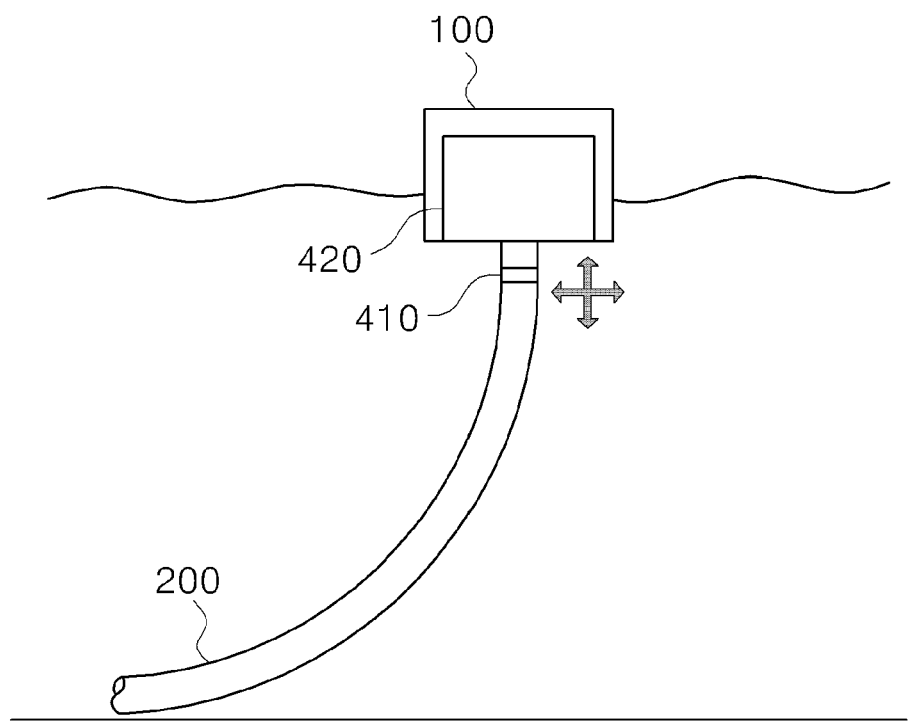
FIG. 5 is a diagram showing that an automatic structure control unit changes a location or angle of the marine structure according to the control operation information according to another embodiment of the present disclosure.

In addition, another embodiment of the present disclosure will be described with reference to FIG. 5. Here, the method may further include (e) by an automatic structure control unit, controlling the marine structure by changing a location or angle of the marine structure according to the control operation information, and the automatic structure control unit may include a coupling unit connected to at least one point on the marine structure and a displace adjusting unit connected to the coupling unit to move the marine structure in four directions. By the automatic structure control unit, it is possible to control the marine structure to have a minimal behavior and a minimal structural change.

In addition, according to another embodiment of the present disclosure, the alarm information is generated by using the data about an actual physical change of the marine structure, which is measured by the measurement device by using at least one of tunable diode laser absorption spectroscopy (TDLAS), distributed temperature sensing (DTS), distributed acoustic sensing (DAS), fiber Bragg grating (FBG) and remote methane leak detector (RMLD).

The term 'marine structure' used in the present disclosure means, for example, jack-up rigs, semi-sub rigs, jackets, compliant towers, TLP, floating petroleum production, storing or extracting facilities, wind power generators and wave energy converters as well as directly or indirectly associated complex structures (e.g., non-subsea structures/flare towers, top-side), berthing-related marine structures, drill rigs, production casings for collecting oil and gas at an oilfield, flow lines, production lines, mooring lines, hawser lines, lowering lines, tethering cable lines for ROV, structure supports and connection cables of sails for environment-friendly fuel savings, tensioners having an optical fiber embedded therein, blades and towers of a wind power generator, jackets, tensioners inserted into a foundation, bridge/cable-stayed bridge cables, structures such as on-water, in-water or under-water supports, and concrete tensioners for such structures.

In the present disclosure, if a ship is operated in ballast without loading cargo, a propeller may float over the water surface, which may deteriorate the propeller efficiency or damage the propeller, thereby giving a serious problem in safe navigation. In order to solve this problem a ballast tank is provided so that the ship may maintain a constant sea gauge, and also the ballast tank allows the ship not to lose its stability even though cargo are loaded disproportionally. In addition, as the ballast tank, a water ballast filled with seawater is generally, but if the water ballast is insufficient, a solid ballast filled with sand may also be used.

In the present disclosure, it is revealed that the measurement instrument for measuring external forces (for example, wind load, wave load, current load) and reactions of a structure (for example, displacement, deformation, motion, vortex) has a broad meaning including a lidar using electric or optical measurement methods, particle induced velocity (PVI), particle tracking velocity (PTV), a strain sensor, an extensometer, an accelerometer, an inclinometer, a pressure meter, a flow meter, a thermometer, a current meter, an acoustic emission monitor, a seismic trigger, a flow velocity sensor, a distributed temperature sensor, a distributed strain sensor, an optical time-domain reflectometer (OTDR) or the like.

In the present disclosure, it is revealed that the measurement instrument for measuring internal forces (for example, sloshing load, flow load, pressure load, thermal load) and reactions of a structure (for example, displacement, deformation, motion, walking, buckling, vortex) has a broad meaning including a lidar using an electric or optical sensor, particle induced velocity (PVI), particle tracking velocity (PTV), a strain sensor, an accelerometer, a current meter, an acoustic emission monitor, a seismic trigger, a flow velocity sensor, a distributed temperature sensor, a distributed strain sensor, an optical time-domain reflectometer (OTDR) or the like.

In addition, according to another embodiment of the present disclosure, the complex optical measuring instrument detects a change of a target structure by using at least one of optical time-domain reflectometer (OTDR), Raman spectra (Raman), Brillouin scattering, Rayleigh wave, distributed acoustic sensing (DAS), acoustic emission, and interferometry In the present disclosure, it is revealed that the time and space information and shape acquisition technique has a broad meaning including aerodynamic data collection methods using an RF- and microwave-GPS, DGPS, RTK, light-lidar, PIV, PIT, an interferometer or the like.

In the present disclosure, it is revealed that the inertial measurement unit (IMU) has a broad meaning including acceleration and rotation measuring devices such as a gyro, a photo grid or the like. In addition, the gyro is a tool used for measuring a direction of an axially symmetric high-speed rotor in an inertial space or measuring an angular velocity with respect to the inertial space, and the gyro is used for measuring a direction and balance (inclination) of an airplane, a ship, a missile or the like to constantly keep a balance with a direction of an airplane or ship in night operation.

In addition, the time and space information and shape acquisition technique and the IMU are operated in association with 6-dof motion, posture reflex, localization and database of the marine structure to control posture control by utilizing a monitoring system, an alarming system and an automatic control system of the artificial intelligence for EEOI/EEDI/DMS/DPS.

Prior to explaining the present disclosure, it is revealed that mathematical models used in the present disclosure has a broad meaning including finite element method (FEM), gas structure interaction, finite difference method, finite volume method, inverse finite element method (IFEM) or the like. Here, the finite element method (FEM) means a numerical calculation method for dividing a continuous structure into a finite number of elements having a one-directional rod, two-directional triangle or rectangle, or three-dimensional solid body (a tetrahedron or a hexahedron) and performing an approximation solution based on energy principles to each region.

In the present disclosure, if an agent converts situation information input by the same sensor as a USN sensor into middleware-dedicated packets and transmits the packets to context cognitive middleware, the context cognitive middleware receives and processes the packets in each module classified based on a function and transmits the processing result to a user program, thereby collecting all kinds of sensor information or controlling all kinds of equipment through an agent which converts monitored and controllable program situation information into middleware-dedicated packets. The middleware is modulated based on each function (notifying, processing, storing, logging, controlling, JO, external application), and data are interlinked between modules by using a middleware message defined with XML to ensure independency among modules. Therefore, it is revealed that the context cognitive middleware has a broad meaning including a correction function, an adding function or the like.

In the present disclosure, the web-based context cognitive monitoring program has a program for monitoring situation information by using the context cognitive middleware and is also a web-based program which is available in a system where flash normally operates. It is revealed that the web-based context cognitive monitoring program has a broad meaning including programs for real-time monitoring (which allows graph presentation, chart presentation), historical data inquiry of 10 minutes on average (for each period or sensor), setting a threshold value for each sensor and alarming at threshold exceed, external program calling for some sensors and result monitoring.

In the present disclosure, electric or optical measurement instruments are integrated to measure load, strain, deformation, displacement, fatigue, crack, vibration, frequency or the like of the marine structure.

The force applied to a hull by the air is caused by three-dimensional velocity and direction, and responses in x, y and z axes with respect to x-, y- or z-axis incident angles are different from each other.

Figure 6:
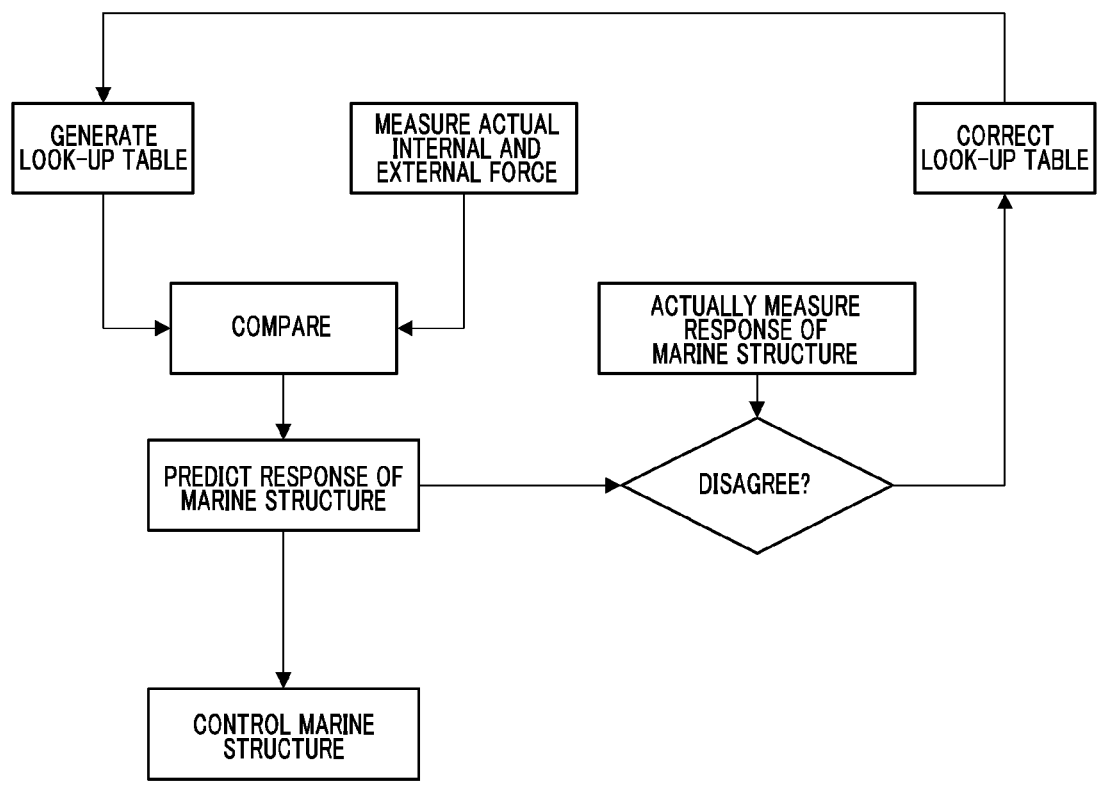
FIG. 6 is a flowchart for illustrating a method for fuel savings and safe operation by monitoring and controlling a marine structure with respect to an aerodynamic and hydrodynamic environmental internal or external force applied to the marine structure of the present disclosure.
Figure 7:
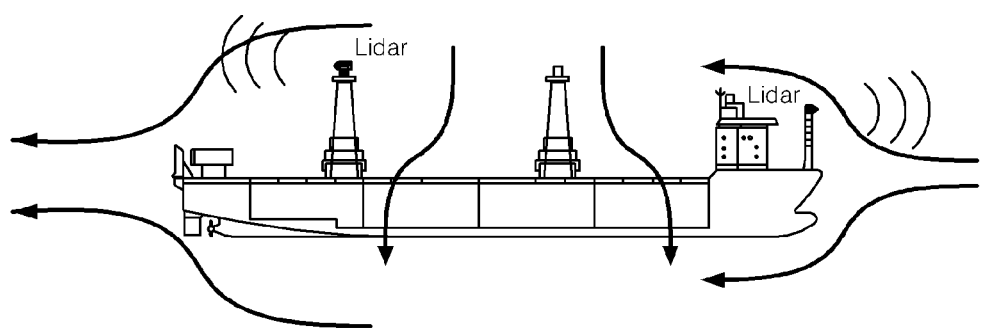
FIG. 7 is a diagram showing an aerodynamic vector applied to a marine structure.

Referring to FIGS. 6 and 7, method for fuel savings and safe operation by real-time predictive monitoring and predictive controlling of aerodynamic environmental internal or external force, hull stresses, 6 degrees of freedom (6-dof) movement and location of a marine structure according to an embodiment of the present disclosure includes a step (1) of accumulating data about an internal or external force applied to a marine structure by a gas flow out of the marine structure by means of a linear test (e.g., hull form test) in a water tank or a wind tunnel and data about a response of the marine structure according to the internal or external force to generate a look-up table, and storing the look-up table in a database, a step (2) of measuring the internal or external force by using a time-of-flight method in an actual voyage of the marine structure and storing the internal or external force in the database, a step (3) of comparing the measurement data of the internal or external force obtained in the step (2) with the data about the internal or external force accumulated in the look-up table in the step (1) to predict data about a response of the marine structure, and a step (4) of controlling a posture or navigation path of the marine structure in real time by using the predicted data about a response of the marine structure.

Hull resistance caused by a change of sea gauge and trim is measured by means of a linear test (e.g., hull form test) in a water tank or a wind tunnel and data, and aerodynamic energy to be applied to the ship is measured by using a radar, a pressure sensor, a strain sensor, an accelerometer or the like in consideration of the influence of 6-dof motion. In this case, direction and velocity of the gas at each altitude are measured according to space and time.

In addition, according to the above steps, mathematical calculation models are associated with actual measurement data to perform automatic control. Direction and velocity of aerodynamic energy to be applied to the hull are measured in advance and applied to the hull, reactions of the marine structure are predicted by utilizing an aerodynamic reaction model test, the test results are compared with actual measurement data, the look-up table is corrected according to the comparison results to develop an optimized aerodynamic reaction model, and then a posture control or navigation path is determined accordingly.

In addition, the step (3) may further include (3-1) measuring an actual response of the marine structure, and (3-2) when the data about a response of the marine structure measured in the step (3-1) does not agree with the data about a response of the marine structure predicted in the step (3), correcting the data about a response of the marine structure stored in the look-up table generated in the step (1) into the data about a response of the marine structure measured in the step (3-1) or applying the corrected data to correct or supplement a numerical model (CFD and/or FEM).

In this case, the data about a response of the marine structure may be corrected by means of a simulator based on finite element analysis (FEA) or inversed finite element method (iFEM).

Regarding the data measured by the measurement instruments, a maximum condition of the computational fluid dynamics (CFD) is input, and correlations between the behavior and 6-dof motion of the marine structure and various physical values. The mathematical model results of the context cognitive middleware are associated with actual measurement data to construct algorithm and simulation. By constructing a web-based system through the context cognitive middleware and the web-based context cognitive monitoring program, a monitoring and predictive controlling system of an artificial intelligence is constructed in addition to a simple monitoring function.

Figure 8:
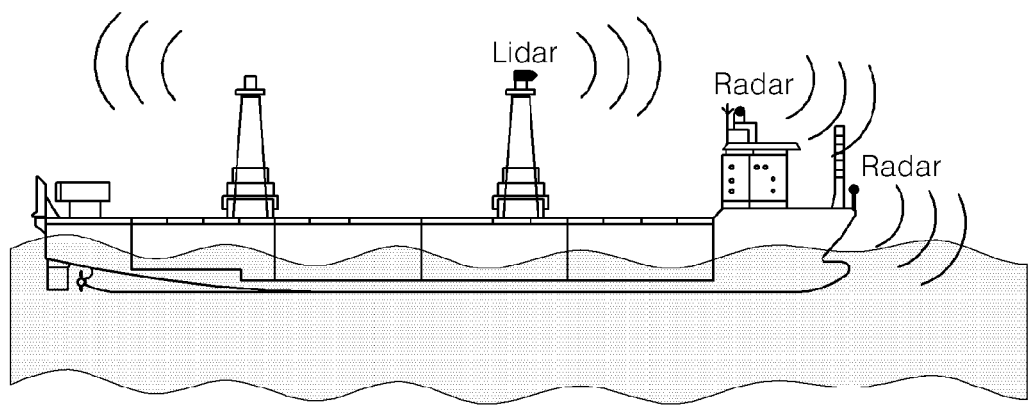
FIG. 8 is a diagram for illustrating a method for measuring an aerodynamic vector applied to a marine structure according to an embodiment of the present disclosure.

Referring to FIG. 8, in the step (2), the internal or external force caused by gas may be measured by using a measurement instrument provided at the floating marine structure, and the measurement instrument may be an electric sensor or an optical sensor. In addition, the measurement instrument may measure wind direction, wind velocity, atmospheric pressure, temperature, humidity and dust at each altitude.

In addition, in the step (2), the internal or external force applied to the marine structure by a gas flow may be actually measured by using the IMU.

In addition, in the step (3), when the marine structure is a ship, a response of the marine structure may include at least one selected from the group consisting of progress direction, four-directional slopes, sea gauge and trim of the ship.

In addition, in the step (3), when the marine structure is a temporarily fixed structure, a response of the marine structure may include at least one selected from the group consisting of moving direction, four-directional slopes and sea gauge of the temporarily fixed structure.

In addition, in the step (2), data including natural frequency, harmonic frequency and gas characteristics of the marine structure by a gas flow may be measured.

In addition, in the step (1), the database storing the look-up table may be a voyage data recorder (VDR) provided at the marine structure.

In addition, an electric or optical sensor may be attached to a mooring line, or a support and a connection cable (or, a sail line) of a sail for environmental-friendly fuel savings to monitor a change of aerodynamic coupled energy.

Measurement data about a stress measured at off-loading or approaching by inserting an optical fiber or an electric strain sensor into a hawser and a loading hose as well as 6-dof motion (heading, swaying, heaving, rolling, pitching, yawing motions) of the marine structure caused by aerodynamic environmental internal or external force are associated with structural analysis, and the off-loading line is controlled in real time or predictively in consideration of a priority order or importance of situation judgment to minimize a force (inertia and elasticity of pipe lines, pumps, inserted tensioners, risers, mooring lines, hawsers, and off-loading lines) applied by aerodynamics.

In addition, the data stored in the database may be utilized as reference data for implementing real-time context cognitive information, situation reproduction of a history recording and situation prediction in preparation for future predictive cases. In addition, the stored data may be used for performing structure diagnosis and work evaluation by means of virtual simulation.

In addition, if the marine structure is a temporarily fixed structure, the look-up table may be recorded as time sequential data by the year, and the look-up table may be corrected by comparing with time sequential data by the year which have been accumulated till the previous year. By doing so, errors may be automatically reduced.

In addition, in the step (4), the posture or navigation path of the marine structure may be controlled in real time by using at least one selected from the group consisting of a rudder, a thruster, a propeller, a sail, a kite and a balloon. In other words, a rudder or the like is controlled to minimize 6-dof motion, and if the marine structure is navigating, a direction of the rudder is controlled to compensate aerodynamic force so that the marine structure may navigate in an optimized path.

Meanwhile, if the marine structure is in operation, rolling may turn over the marine structure or drop cargo. In this case, if at least one key is installed below the marine structure, rolling may be reduced by means of friction of the key.

Figure 9:
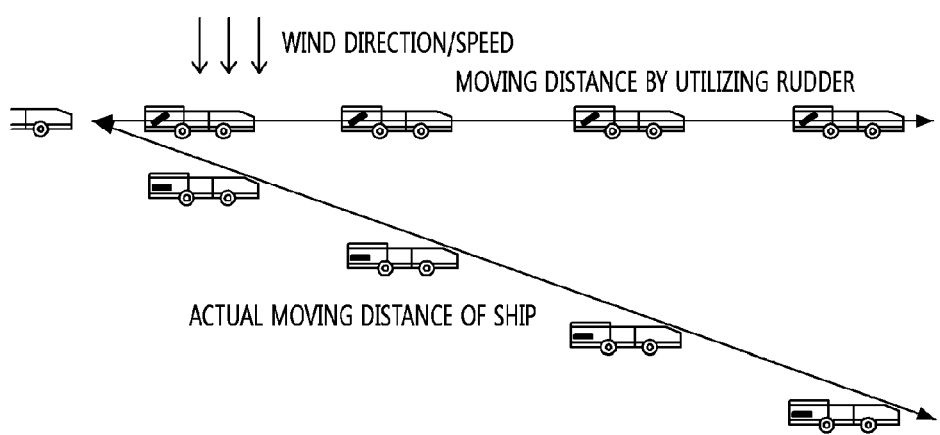
FIG. 9 is a diagram for illustrating a method for fuel savings and safe operation by controlling a rudder when an internal or external force is applied by means of aerodynamics according to an embodiment of the present disclosure.

Referring to FIG. 9, another embodiment of the present disclosure will be described. In the step (4), if the marine structure is a ship, a direction of the rudder or a RPM of the thruster or propeller may be controlled according to the data about a predicted response of the marine structure so that a resultant force of a propelling force and the internal or external force has a targeted progress direction. For example, it may be found in FIG. 9 that a moving distance to a target point is shortened when the rudder is controlled with respect to an internal or external force applied to the ship by means of aerodynamics, in comparison to the case where the rudder installed at the ship is not controlled.

In addition, if the marine structure is a temporarily fixed structure, a thruster may be controlled according to the predicted data about a response of the marine structure so that a resultant force with the internal or external force is minimized to maintain a current location.

Figure 13:
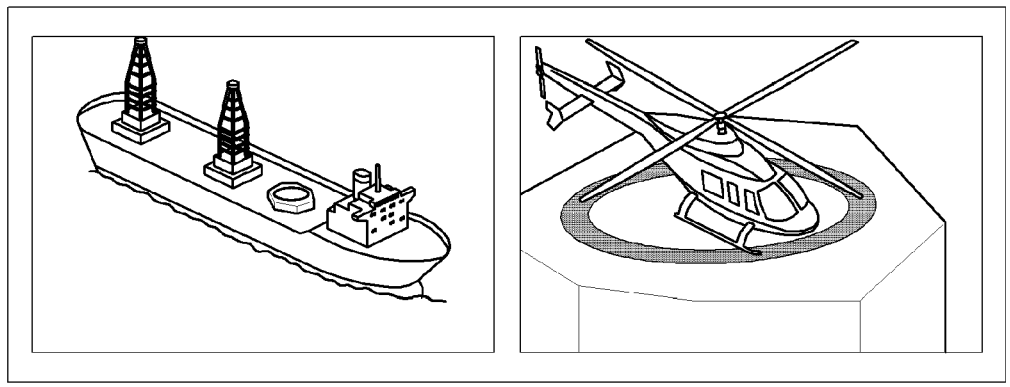
FIG. 13 is a diagram showing a marine structure (particularly, a ship) and a helideck installed at the marine structure.

Referring to FIG. 13, the marine structure may include a helideck. Here, in the step (4), a center of gravity of the marine structure is changed by controlling a posture of the marine structure or adjusting an 6-dof angle by means of dynamic positioning (DP) or dynamic motioning (DM) so as to maintain a balance of the helideck or relieve a shock when a helicopter takes off or lands, and balanced state information of the helideck may be stored in the database.

In addition, the balanced state information of the helideck obtained by controlling a posture of the marine structure is stored in the database. Also, the database may transmit the balanced state information of the helideck to an external structure information server through a communication unit, and the structure information server may provide the helicopter with location information of a marine structure, which has the balanced state information of the helideck allowing taking-off or landing of a helicopter, among a plurality of marine structures. In addition, the 6-dof angle such as a trim may be adjusted to change the center of gravity of the marine structure and maintain a balanced state so as to maintain a balance suitable for a targeted function (including, helicopter taking-off or landing, a separator, and a liquefying process) of the marine structure or relieve shocks. In particular, when a helicopter takes off or lands, an impact at the marine structure or helideck and the helicopter supporting structure may be relieved.

In addition, the step (2) may further include (2-1) measuring at least one selected from the group consisting of wind direction, wind velocity, temperature, humidity, atmospheric pressure, solar radiant rays, inorganic ions, carbon dioxide, dust, radioactivity and ozone at a remote distance from the marine structure by using a measurement instrument, and storing the measurement data in the database.

The measurement instrument may include at least one selected from the group consisting of an anemometer, a weathervane, a hygrometer, a thermometer, a barometer, a solarimeter, an atmospheric gassol automatic collector, a $CO_2$ flux measurement instrument, an atmospheric dust collector, an air sampler and an ozone analyzer.

In addition, by using the IMU, the time and space information and shape acquisition technique and the radar capable of detecting X-band and S-band, collision with a dangerous article is prevented, and a wind direction, a wind velocity, an atmospheric pressure and a temperature are predicted. In addition, by using at least one IMU, hogging, sagging and torsion as well as 6-dof motion of the marine structure are measured, and by using the time and space information acquisition technique, a moving distance of the marine structure and environmental internal or external force data of a coordinate measuring satellite are associated with the radar and IMU data to minimize a fatigue of the marine structure.

In addition, the number of polar images collected by the radar is not limited to 32, and when a new polar image is received, a first or oldest polar image is deleted to ensure real-time dynamic image processing. By doing so, collision with a dangerous article may be prevented, and a wind velocity, a wind direction, an atmospheric pressure and a temperature may be predicted. In addition, an existing X-band or S-band anti-collision radar is used by utilizing a radio frequency (RF) 1×2 splitter or a RF amplifier. In addition, the influence caused by a 6-dof motion is compensated with respect to the measurement data of the wave radar, and a time-of-flight method and an image overlay method are used.

Figure 10:
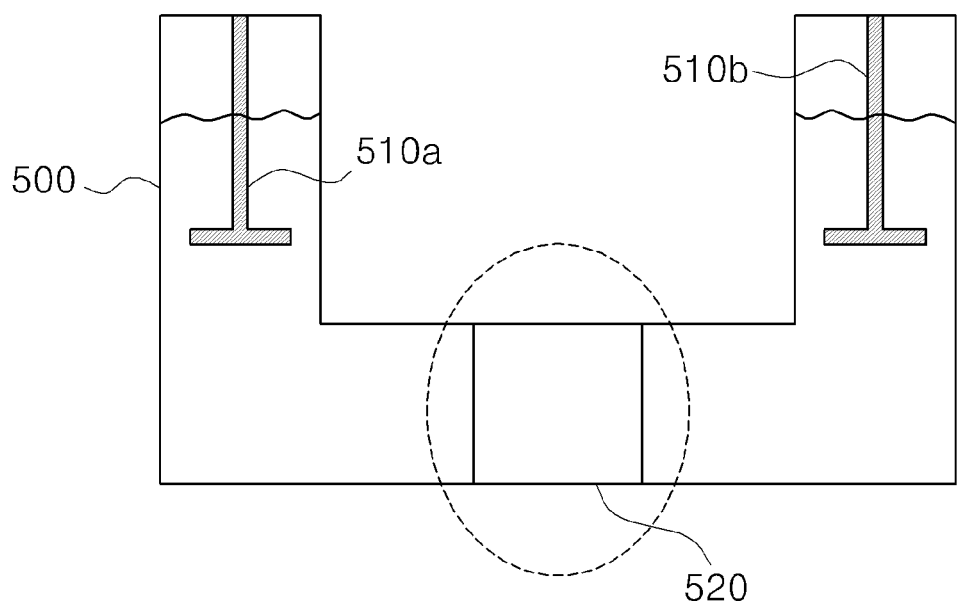
FIGS. 10 and 11 are a cross-sectional view showing a ballast tank according to another embodiment of the present disclosure and a diagram showing a barrier provided at the ballast tank and a structure of the barrier.

Referring to FIG. 10, the marine structure may include a ballast tank, and sloshing restraining units respectively provided at both sides of the ballast tank to reduce a sloshing phenomenon in the ballast tank. In addition, the sloshing restraining unit restrains a sloshing phenomenon by decreasing an opening area of one horizontal section of the ballast tank.

Figure 11:
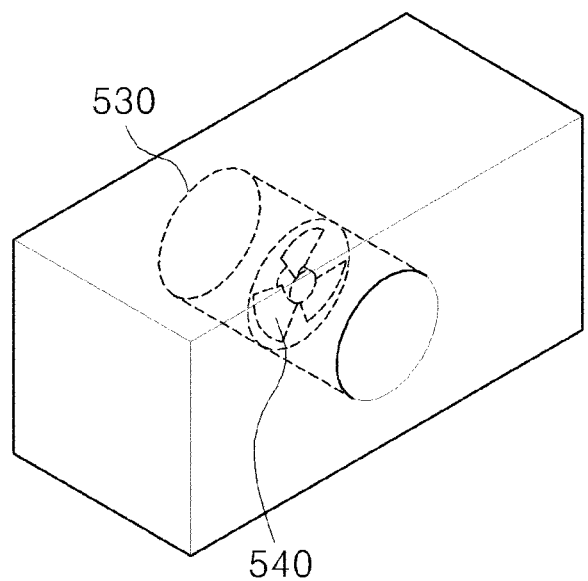

In addition, referring to FIG. 11, in the step (4), when a slope occurs in marine structure due to an aerodynamic internal or external force, ballast water loaded in the ballast tank is moved in a direction opposite to the slope to control a posture of the marine structure. In addition, the ballast tank may include a barrier for partitioning an inside of the ballast tank, and an opening/closing unit may be installed at the barrier to move the ballast water to another partition. Also, a pump may be installed in the opening/closing unit to control a moving speed and a moving direction of the ballast water. In addition, the ballast tank may be connected to a water gauge to monitor a water level of the ballast tank and perform active control by means of feeding-back and/or feeding-forward.

In addition, the measurement data of the internal or external force obtained in the step (2) may be transmitted to an external weather information server, and the weather information server may store weather information correction data whose error is corrected by comparing weather information received from a satellite with the measurement data of the internal or external force.

In addition, the weather information correction data may be provided to an external user terminal which accesses the weather information server according to a request of the external user terminal.

Meanwhile, according to another embodiment of the present disclosure, there is also provided a method for providing maintenance information by real-time predictive monitoring of aerodynamic environmental internal or external force, hull stresses, 6-dof motion and location of a marine structure, which includes a step (1) of accumulating data about an internal or external force applied to a marine structure by a gas flow out of the marine structure by means of a linear test (e.g., hull form test) in a water tank or a wind tunnel and data about a response of the marine structure according to the internal or external force to generate a look-up table, and storing the look-up table in a database, a step (2) of measuring the internal or external force by using a time-of-flight method in an actual voyage of the marine structure, a step (3) of comparing the measurement data of the internal or external force obtained in the step (2) with the data about the internal or external force accumulated in the look-up table in the step (1) to predict data about a response of the marine structure, a step (3-1) of measuring an actual response of the marine structure, a step (3-2) of comparing the data about a response of the marine structure measured in the step (3-1) with the data about a response of the marine structure predicted in the step (3), and if there is a difference, correcting the data about a response of the marine structure stored in the look-up table generated in the step (1) into the data about a response of the marine structure measured in the step (3-1), a step (4) of obtaining maintenance data about the marine structure by performing virtual simulation to the data accumulated in the look-up table, and a step (5) of applying actual measurement data of the virtual simulation to compare a response result value which is a result of the virtual simulation with real-time actual measurement value about a response of the marine structure, and correcting the data about a response of the marine structure or applying the corrected data to correct or supplement a numerical model.

Referring to FIG. 12, according to an embodiment of the present disclosure, data obtained by simulating the maintenance data may be checked. For example, the maintenance data may include location information, maintenance cost information, required maintenance time information, residual life information or the like of individual structures provided at the marine structure according to the importance order, when being output.

In addition, after the step (4), the method may further include a step of generating a simulator with the marine structure control information by means of a fluid structure interaction (FSI) program, and associating the simulator with the data about an actual response of the marine structure, obtained in the step (3-1), by means of context cognitive middleware to generate an algorithm for automatically controlling the marine structure.

In addition, in the step (4), a three-dimensional numerical analysis program using finite element method (FEM) and computational fluid dynamics (CFD) is associated with a situation analysis module which stores virtual augmented reality data about information including gas leak, gas diffusion, fire or explosion, which probably occurs according to a behavior and structural change of the marine structure, and countermeasures against the virtual augmented reality data, to generate maintenance information.

In addition, the data about a response of the marine structure may include at least one selected from the group consisting of strain, deformation, crack, vibration, frequency, corrosion, and erosion. The frequency includes natural frequency and harmonic frequency and may be associated with a structure analysis method to avoid a frequency applied to the marine structure so as to be utilized as data for minimizing a fatigue and elongating the life span.

In addition, the maintenance data of the step (4) may be obtained distinguishably according to preset importance of individual structures provided at the marine structure.

When control is made to satisfy a DP condition or a DP boundary condition, a priority order in relation to fatigue minimization is determined for individual structures provided at the marine structure, and the individual structures may be operated in the order of emergent, urgent, preferential or the like to suitably enhance the efficiency of EEOI/EEDI/DMS/DPS.

In addition, the maintenance data may include at least one selected from the group consisting of maintenance-required location information, maintenance cost information, required maintenance time information and residual life information of each structure.

The data about a response of the marine structure by the predicted slamming and a response of the storage tank including the ballast tank are associated with mathematical models to obtain an optimizing and artificial intelligence algorithm, and the result is stored in a voyage data recorder (VDR) or a separate server as a look-up table to control a posture of the marine structure and minimize a damage. In addition, the stored data is utilized as reference data for implementing real-time context cognitive information, situation reproduction of a history recording and situation prediction in preparation for future predictive cases. In addition, the stored data may be used for performing structure diagnosis and work evaluation by means of virtual simulation.

An optimized predictive simulator is implemented by successively applying actual measurement data to the algorithm or simulator and correcting the look-up table. The algorithm or simulator may be applied to a marine structure including risers (including a steel catenary riser (SCR), a top tensioned riser (TTR) and a tendon), a remotely operated vehicle (ROV), a drill rig or the like to implement automation using an automatic learning technique.

Referring to FIG. 6, a method for fuel savings and safe operation by real-time predictive monitoring and predictive controlling of hydrodynamic environmental internal or external force, hull stresses, 6-dof motion and location of a marine structure according to an embodiment of the present disclosure includes a step (1) of accumulating data about an internal or external force applied to a marine structure by a fluid flow out of the marine structure by means of a linear test (e.g., hull form test) in a water tank or a wind tunnel and data about a response of the marine structure according to the internal or external force to generate a look-up table, and storing the look-up table in a database, a step (2) of, by a measurement instrument, measuring the internal or external force by using a time-of-flight method in an actual voyage of the marine structure and storing the internal or external force in the database, a step (3) of comparing the measurement data of the internal or external force obtained in the step (2) with the data about the internal or external force accumulated in the look-up table to predict data about a response of the marine structure, and a step (4) of controlling a posture or navigation path of the marine structure in real time by using the predicted data about a response of the marine structure.

Hull resistance caused by a change of sea gauge and trim is measured by means of a linear test (e.g., hull form test) in a water tank or a wind tunnel and data, and aerodynamic energy to be applied to the ship is measured by using a pressure sensor, a strain sensor, an accelerometer or the like in consideration of the influence of 6-dof motion. In this case, directions and velocities of a sea current and a tidal current at each height are measured according to space and time.

In addition, according to the above steps, mathematical calculation models are associated with actual measurement data to perform automatic control. Direction and velocity of hydrodynamic energy to be applied to the hull are measured in advance and applied to the hull, reactions of the marine structure are predicted by utilizing a hydrodynamic reaction model test, the test results are compared with actual measurement data, the look-up table is corrected according to the comparison results to develop an optimized hydrodynamic reaction model, and then a posture control or navigation path is determined accordingly.

In addition, the step (3) may further include (3-1) measuring an actual response of the marine structure, and (3-2) when the data about a response of the marine structure measured in the step (3-1) does not agree with the data about a response of the marine structure predicted in the step (3), the data about a response of the marine structure stored in the look-up table generated in the step (1) is corrected into the data about a response of the marine structure measured in the step (3-1) or the corrected data is applied to correct or supplement a numerical model.

In this case, the data about a response of the marine structure may be corrected by means of a simulator based on finite element analysis (FEA).

Regarding the data measured by the measurement instruments, a maximum condition of the computational fluid dynamics (CFD) is input, and correlations between the behavior and 6-dof motion of the marine structure and various physical values. The mathematical model results of the context cognitive middleware are associated with actual measurement data to construct algorithm and simulation. By constructing a web-based system through the context cognitive middleware and the web-based context cognitive monitoring program, a monitoring and predictive controlling system of an artificial intelligence is constructed in addition to a simple monitoring function.

In addition, in the step (2), the internal or external force caused by fluid may be measured by using a measurement instrument provided at a side of the floating marine structure, and the measurement instrument may be an electric sensor or an optical sensor In addition, in the step (2), the internal or external force applied to the marine structure by a fluid flow may be actually measured by using an internal measurement unit (IMU).

In addition, in the step (3), when the marine structure is a ship, the data about a response of the marine structure may include at least one selected from the group consisting of progress direction, four-directional slopes, sea gauge and trim of the ship.

In addition, in the step (3), when the marine structure is a temporarily fixed structure, the data about a response of the marine structure may include at least one selected from the group consisting of moving direction, four-directional slopes and sea gauge of the temporarily fixed structure.

In addition, in the step (2), directions and velocities of a tidal current and a sea current according to space and time may be measured for each water level.

In addition, in the step (2), data including natural frequency, harmonic frequency and fluid characteristics of the marine structure by a fluid flow may be measured.

In addition, in the step (1), the database storing the look-up table may be a voyage data recorder (VDR) provided at the marine structure.

In addition, an electric or optical sensor may be attached to a mooring line, or a support and a connection cable (or, a sail line) of a sail for environmental-friendly fuel savings to monitor a change of hydrodynamic coupled energy.

Measurement data about a stress measured at off-loading or approaching by inserting an optical fiber or an electric strain sensor into a hawser and a loading hose as well as 6-dof motion (heading, swaying, heaving, rolling, pitching, yawing motions) of the marine structure caused by hydrodynamic environmental internal or external force are associated with structural analysis, and the off-loading line is controlled in real time or predictively in consideration of a priority order or importance of situation judgment to minimize a force (inertia and elasticity of pipe lines, pumps, inserted tensioners, risers, mooring lines, hawsers, and off-loading lines) applied by hydrodynamics.

In addition, the data stored in the database may be utilized as reference data for implementing real-time context cognitive information, situation reproduction of a history recording and situation prediction in preparation for future predictive cases. In addition, the stored data may be used for performing structure diagnosis and work evaluation by means of virtual simulation.

In addition, if the marine structure is a temporarily fixed structure, the look-up table may be recorded as time sequential data by the year, and the look-up table may be corrected by comparing with time sequential data by the year which have been accumulated till the previous year. By doing so, errors may be automatically reduced.

In addition, in the step (4), the posture or navigation path of the marine structure may be controlled in real time by using at least one selected from the group consisting of a rudder, a thruster, a propeller and a sail. In other words, a rudder or the like is controlled to minimize 6-dof motion, and if the marine structure is navigating, a direction of the rudder is controlled to compensate hydrodynamic force so that the marine structure may navigate in an optimized path.

Meanwhile, if the marine structure is in operation, rolling may turn over the marine structure or drop cargo. In this case, if at least one key is installed below the marine structure, rolling may be reduced by means of friction of the key.

In addition, another embodiment of the present disclosure will be described with reference to FIG. 9. In the step (4), if the marine structure is a ship, a direction of the rudder or a RPM of the thruster or propeller may be controlled according to the data about a predicted response of the marine structure so that a resultant force of a propelling force and the internal or external force has a targeted progress direction. For example, it may be found in FIG. 9 that a moving distance to a target point is shortened when the rudder is controlled with respect to an internal or external force applied to the ship by means of hydrodynamics, in comparison to the case where the rudder installed at the ship is not controlled.

In addition, if the marine structure is a temporarily fixed structure, a thruster may be controlled according to the predicted data about a response of the marine structure so that a resultant force with the internal or external force is minimized to maintain a current location.

In addition, referring to FIG. 13, the marine structure may include a helideck. Here, in the step (4), a center of gravity of the marine structure may be changed by controlling a posture of the marine structure by means of dynamic positioning (DP) or dynamic motioning (DM) so as to maintain a balance of the helideck, and balanced state information of the helideck may be stored in the database. In addition, the balanced state information of the helideck obtained by controlling a posture of the marine structure is stored in the database. Also, the database may transmit the balanced state information of the helideck to an external structure information server through a communication unit, and the structure information server may provide the helicopter with location information of a marine structure, which has the balanced state information of the helideck allowing taking-off or landing of a helicopter, among a plurality of marine structures. In addition, the 6-dof angle such as a trim may be adjusted to change the center of gravity of the marine structure and maintain a balanced state so as to maintain a balance suitable for a targeted function (including, helicopter taking-off or landing, a separator, and a liquefying process) of the marine structure or relieve shocks. In particular, when a helicopter takes off or lands, an impact at the marine structure or helideck and the helicopter supporting structure may be relieved.

In addition, in the steps (1) and (2), the data about the internal or external force applied to the marine structure by a fluid flow may be data about vectors of a sea current and a tidal current, measured by a pressure sensor installed at a side of the marine structure.

Figure 14:
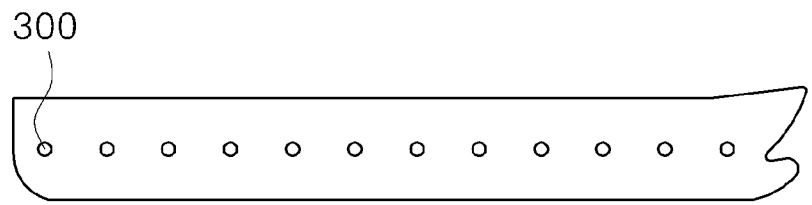
FIG. 14 is a diagram showing that a pressure sensor is installed at a marine structure according to an embodiment of the present disclosure.
Figure 14:
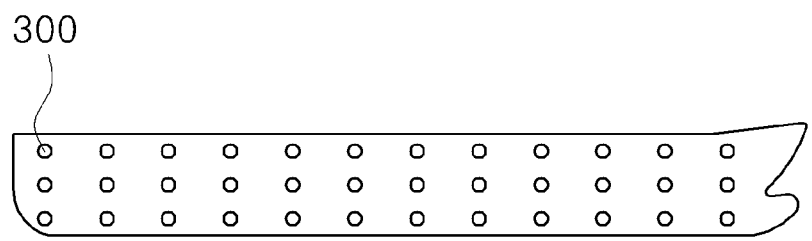

In addition, another embodiment of the present disclosure will be described with reference to FIG. 14. In this embodiment, there may be provided a plurality of pressure sensors installed at regular intervals at the side of the marine structure. Meanwhile, in order to monitor a wave applied to the marine structure, a three-dimensional pressure sensor module is installed at a side of the marine structure to analyze the measured and extract vectors of a sea current and a tidal current. From this, it may be understood that a wave comes at an installation location of a sensor showing a greatest value. By doing so, a wave velocity as well as a wave direction according to space and time may be analogized by calculating a strain value by a wave.

In addition, the step (2) may further include (2-1) measuring at least one selected from the group consisting of a wave intensity, a wave height, a wave cycle, a wave velocity and a wave direction at a remote distance from the marine structure by using a weather measurement instrument, and storing the measurement data in the database, and the weather measurement instrument may include at least one selected from the group consisting of a wave radar, a directional wave rider, a sea level monitor, an ultrasonic displacement sensor, an amemovane and an ultrasonic wave-height meter.

In addition, another embodiment of the present disclosure will be described with reference to FIG. 14. Here, there may be provided a plurality of pressure sensors with different heights at the side of the marine structure, and the presence of measurement data obtained from the pressure sensors may be analyzed to obtain wave height data from the data obtained from an uppermost pressure sensor. In addition, a wave cycle may also be calculated by measuring a period of the measurement data.

Meanwhile, another embodiment of the present disclosure will be described with reference to FIG. 8. Here, the step (2) may further include (2-1) measuring at least one selected from the group consisting of a wave intensity, a wave height, a wave cycle, a wave velocity and a wave direction at a remote distance from the marine structure by using a wave radar 310, and storing the measurement data in the database. By utilizing the wave radar 310, it is possible to calculate hydrodynamics applied to the marine structure by measuring a wave intensity, a wave height, a wave cycle, a wave velocity or a wave direction from a distance of several hundred meters.

By using the IMU, the time and space information and shape acquisition technique and the radar capable of detecting X-band and S-band, collision with a dangerous article is prevented, and a motion of a wave such as wave intensity or height is predicted. In addition, by using at least one IMU, hogging, sagging and torsion as well as 6-dof motion of the marine structure are measured, and by using the time and space information acquisition technique, a moving distance of the marine structure and environmental internal or external force data of a coordinate measuring satellite are associated with the radar and IMU data to minimize a fatigue of the marine structure.

In addition, the number of polar images collected by the wave radar is not limited to 32, and when a new polar image is received, a first or oldest polar image is deleted to ensure real-time dynamic image processing. By doing so, collision with a dangerous article may be prevented, and a motion of a wave such as wave intensity or height may be predicted. In addition, an existing X-band or S-band anti-collision radar is used by utilizing a radio frequency (RF) 1×2 splitter or a RF amplifier. In addition, the influence caused by a 6-dof motion is compensated with respect to the measurement data of the wave radar, and a time-of-flight method and an image overlay method are used.

In addition, another embodiment of the present disclosure will be described with reference to FIG. 10. Here, the marine structure may include a ballast tank, and sloshing restraining units respectively provided at both sides of the ballast tank to reduce a sloshing phenomenon in the ballast tank. In addition, the sloshing restraining unit restrains a sloshing phenomenon by decreasing an opening area of one horizontal section of the ballast tank.

In addition, another embodiment of the present disclosure will be described with reference to FIG. 11. Here, in the step (4), when a slope occurs in marine structure, ballast water loaded in the ballast tank may be moved in a direction opposite to the slope to control a posture of the marine structure. In addition, the ballast tank may include a barrier for partitioning an inside of the ballast tank, and an opening/closing unit may be installed at the barrier to move the ballast water to another partition. Also, a pump may be installed in the opening/closing unit to control a moving speed and a moving direction of the ballast water. In addition, the ballast tank may be connected to a water gauge to monitor a water level of the ballast tank and perform active control by means of feeding-back and/or feeding-forward.

In addition, the measurement data of the internal or external force obtained in the step (2) may be transmitted to an external weather information server, and the weather information server may store weather information correction data whose error is corrected by comparing weather information received from a satellite with the measurement data of the internal or external force.

In addition, the weather information correction data may be provided to an external user terminal which accesses the weather information server according to a request of the external user terminal.

Meanwhile, according to another embodiment of the present disclosure, there is also provided a method for providing maintenance information by real-time predictive monitoring of hydrodynamic environmental internal or external force, hull stresses, 6-dof motion and location of a marine structure, which includes a step (1) of accumulating data about an internal or external force applied to a marine structure by a fluid flow out of the marine structure by means of a linear test (e.g., hull form test) in a water tank or a wind tunnel and data about a response of the marine structure according to the internal or external force to generate a look-up table, a step (2) of measuring the internal or external force by using a time-of-flight method in an actual voyage of the marine structure, a step (3) of comparing the measurement data of the internal or external force obtained in the step (2) with the data about the internal or external force accumulated in the look-up table in the step (1) to predict data about a response of the marine structure, a step (3-1) of measuring an actual response of the marine structure, a step (3-2) of comparing the data about a response of the marine structure measured in the step (3-1) with the data about a response of the marine structure predicted in the step (3), and if there is a difference, correcting the data about a response of the marine structure stored in the look-up table generated in the step (1) into the data about a response of the marine structure measured in the step (3-1), and a step (4) of obtaining maintenance data about the marine structure by performing virtual simulation to the data accumulated in the look-up table.

Referring to FIG. 12, according to an embodiment of the present disclosure, data obtained by simulating the maintenance data may be checked. For example, the maintenance data may include location information, maintenance cost information, required maintenance time information, residual life information or the like of individual structures provided at the marine structure according to the importance order, when being output.

In addition, the data about a response of the marine structure may include at least one selected from the group consisting of strain, deformation, crack, vibration, frequency, corrosion, and erosion. The frequency includes natural frequency and harmonic frequency and may be associated with a structure analysis method to avoid a frequency applied to the marine structure so as to be utilized as data for minimizing a fatigue and elongating the life span.

In addition, the maintenance data of the step (4) may be obtained distinguishably according to preset importance of individual structures provided at the marine structure.

When control is made to satisfy a DP condition or a DP boundary condition, a priority order in relation to fatigue minimization is determined for individual structures provided at the marine structure, and the individual structures may be operated in the order of emergent, urgent, preferential or the like to suitably enhance the efficiency of EEOI/EEDI/DMS/DPS.

In addition, the maintenance data may include at least one selected from the group consisting of maintenance-required location information, maintenance cost information, required maintenance time information and residual life information of each structure.

An electric or optical sensor is inserted into at least one point of a floating mat assembly to measure load, strain, deformation, displacement, fatigue, micro crack, vibration and frequency of the floating mat assembly, caused by sloshing. An electric or optical sensor is also inserted between walls of a fluid storage tank to measure load, strain, deformation, displacement, fatigue, micro crack, vibration and frequency, caused by an impact between the floating mat and the wall of the fluid storage tank by sloshing.

A floating mat unit has a structure or material floatable in liquid such as LNG and is applicable to a LNG tank, a ballast tank or the like. The floating mat is sized in consideration of a maximum amount of substance filling the tank and also minimizes sloshing as well as an impact to the mat and the tank by the sloshing.

Even though the measurement on the marine structure and the tank is important, since a response of the marine structure by slamming is not always constant, an electric or optical sensor is inserted to measure load, strain, deformation, displacement, fatigue, micro crack, vibration and frequency of the floating mat assembly, caused by sloshing, and then the measurement data is utilized as data for minimizing an impact between the marine structure and the tank by means of safety diagnosis and control.

The data about a response of the marine structure by the measured slamming and a response of the storage tank including the ballast tank are associated with mathematical models to obtain an optimizing and artificial intelligence algorithm, and the result is stored in a voyage data recorder (VDR) or a separate server as a look-up table to control a posture of the marine structure and minimize a damage. In addition, the stored data is utilized as reference data for implementing real-time context cognitive information, situation reproduction of a history recording and situation prediction in preparation for future predictive cases. In addition, the stored data may be used for performing structure diagnosis and work evaluation by means of virtual simulation.

An optimized predictive simulator is implemented by successively applying actual measurement data to the algorithm or simulator and correcting the look-up table. The algorithm or simulator may be applied to a marine structure including risers (including a steel catenary riser (SCR), a top tensioned riser (TTR) and a tendon), a remotely operated vehicle (ROV), a drill rig or the like to implement automation using an automatic learning technique.

A controlling method by real-time monitoring of hydrodynamic environmental internal or external force, hull stresses, 6-dof motion and location of a marine structure according to an embodiment of the present disclosure includes measuring a wave intensity and a wave height and predicting a wave motion as well as preventing collision by using a radar, an internal measurement unit (IMU), a global positioning system (GPS) measurement technique and an X-band radar, measuring hogging, sagging and torsion as well as 6-dof motion of a marine structure by using at least one IMU, associating data about a moving distance of the marine structure and environmental external force of a coordinate measuring satellite with the data of the radar and the IMU by using a time and space information obtaining tool to minimize a fatigue of the marine structure, and applying to an energy efficiency operating indicator (EEOI), an energy efficiency design index (EEDI), a dynamic positioning (DP) boundary, a motion controlling (MC) boundary, risers (including a steel catenary riser (SCR), a top tensioned riser (TTR) and a tendon), a lowering line, a remotely operated vehicle (ROV) and a drill rig to substitute an algorithm and a simulator of a prediction procedure. In addition, a wave height, a wave intensity, a wave period, a wave velocity and a wave direction may be measured by using a radar, the number of polar images collected by the radar may not be limited to 32, and when a new polar image is received, a first or oldest polar image may be deleted to ensure real-time dynamic image processing. In addition, a collision prevention function, a wave intensity and height measurement function and a wave motion prediction function may be associated. Moreover, measurement results of a wave intensity, a wave height, a wave period and a wave direction may be extracted by using an existing X-band or S-band anti-collision radar and utilizing a radio frequency (RF) 1×2 splitter, a RF amplifier or an optical signal transmission and amplification function. In addition, a 6-dof motion compensated X/S-Band wave radar, a wave height measuring sensor, a Doppler, a time-of-flight and image overlay method may be used.

1. A time and space information acquisition tool (for example, by utilizing an RF- and microwave-GPS, DGPS, RTK, light-lidar, PIV, PIT, an interferometer or the like, and in the water, by utilizing sonic wave, ultrasonic wave, light/lidar or the like) and a smart IMU (including an artificial intelligence in which electric/photoelectric gyro+ electric acceleration such as photo grid and MEM+environmental external force measurement are associated, indirectly associated or non-associated (direct and indirect experience) and DB of context cognitive information are associated with 6-dof motion/reaction response measurement and a database (DB) which recognizes situations of a marine structure, and motion control is performed to utilize a predictive monitoring system, a predictive adviser system, and/or a predictive automated control system for an energy efficiency operating indicator (EEOI), a dynamic positioning system (DPS) and a dynamic monitoring system (DMS) of an artificial intelligence associated or non-associated with environmental external force measurement.

(1) When control is made to satisfy a DP condition or a DP boundary condition, a priority order is applied to structures and complex structures (for example, the priority order is firstly given to subsea structures/risers/drill rigs/hawser lines and/or mooring lines, and then non-subsea structures/flare towers, top-sides, and hulls, . . . ) to determine a priority order for minimizing a fatigue, and the marine structures are operated to ensure maximum control efficiency of DPS, DMS or EEOI.

(2) When control is made to satisfy EEOI/EEDI conditions, a priority order is applied to structures and complex structures (for example, rudders, thrusters, propeller RPM, ballistic, fuel and/or storage tanks, wind sails, mooring line tensioners, risers and/or their tensioners) to determine a priority order for minimizing a fatigue, and the marine structures are operated to ensure maximum control efficiency of DPS or EEOI, or quantitative EEDI is measured.

(3) A drill rig/riser is monitored to set a most convenient posture of a marine structure and perform predictive control, and damping is performed in consideration of necessary 6-dof at a necessary time (for example, motion damping is performed based on heaves at a connection portion, and a hydraulic motor is controlled in advance in consideration of a predicted motion to perform necessary damping in consideration of 6-dof motion).

2. A life span of a structure is elongated by avoiding inherent response frequency (natural frequency or harmonic frequency) of individual or integrated marine complex structures according to hydrodynamic and aerodynamic influences applied to the structure or changing a condition of an environmental external force applied to the structure.

(1) A life span of a structure is elongated by minimizing a yield stress and a fatigue independently or complexly applied to the structure according to importance or a priority order on circumstantial judgment by means of real-time measurement of an environmental external force applied to a structure, a complex energy applied to a complex structure and inertial and elastic kinetic energy possessed by the structure and association of calculated numerical results and 6-dof motion prediction.

3. Condition-based maintenance is allowed by measuring integrity of a mooring line and accurately predicting a life span of the mooring line (for example, by utilizing static and dynamic numerals and change rates of tension, strain, elongation, vibration or the like, and their acceleration) to extract the integrity in real time, and unusual cold is reflected to control static and dynamic positioning of a marine structure in a manual or automatic way and manage operations by applying a residual fatigue.

(1) In mooring, mooring line tension monitoring is associated to control a motion and posture of a structure in consideration of environmental external force-applied DP predictive monitoring and predictive controlling, MC predictive monitoring and predictive controlling, and EEOI.

(2) Optical measurement vibration (including DAS) is measured and applied to a seabed structure (for example, mooring lines, risers, umbilical line structures) to measure a vibration of the structure and extract a deformation rate of the structure through existing strain or acceleration measurement, an environmental external force (including a vector of an external force of a tidal current or a sea current) applied in association with a deformation state, and a vector of a resultant response of the structure.

(3) When measurement of an environmental external force is associated, a context cognitive function is predicted and stored in a DB by inputting a maximum condition to CFD, FEA and/or FSI, and CFD, FEA, coupled response models and FSI (an environmental external force and a structure motion model responding to the environmental external force) are utilized.

4. A measurement result for circumstance recognition required for implementing real-time context cognitive information, situation reproduction of a history recording and situation prediction in preparation for future predictive cases is acquired and stored in a DB.

(1) A real-time web-based system is constructed by utilizing context cognitive middleware and a web-based context cognitive monitoring program.

(2) A context cognitive middleware or a software having a similar function is associated with measurement results of all context cognitive functions to serve as a base tool for optimizing mathematical models (including CFD, FEA and/or FSI), and the optimized mathematical models evolves to an algorithm and simulation to which actual measurement is applied.

(3) An algorithm to which actual measurement or numerical calculation is applied is associated in addition to a simple measurement monitoring function to implement a predictive monitoring and predictive controlling system or simulation configured as an artificial intelligence.

(4) A database having integrated measurement for context cognitive information is stored in or associated with a voyage data recorder (VDR) to extract hydrodynamic and/or aerodynamic energy (for example, a wave direction, a wind velocity, a vector of the wind direction and the wind velocity, and a vector of a resultant response of the structure).

5. A radar+IMU+GPS measurement technique and an X-band or S-band radar is used to prevent a collision as well as measure a wave intensity and a wave height and predict a wave motion, at least one IMU is used to measure hogging, sagging and torsion as well as 6-dof motion of the hull, a time and space information acquisition tool (for example, by utilizing an RF- and microwave-GPS, DGPS, RTK, lightlidar, PIV, PIT, an interferometer or the like, and in the water, by utilizing sonic wave, ultrasonic wave, light/lidar or the like) is used to minimize a fatigue of the hull by associating a moving distance of the ship and environmental external force data of a coordinate measuring satellite with the data of the radar and the IMU, and this is applied to an energy efficiency operating indicator (EEOI), an energy efficiency design index (EEDI), a dynamic positioning (DP) boundary, a dynamic monitoring (DM) boundary, risers (including a steel catenary riser (SCR), a top tensioned riser (TTR) and a tendon), a lowering line, a remotely operated vehicle (ROV) and a drill rig to substitute an algorithm and a simulator of a prediction procedure.

(1) A wave height, a wave intensity, a wave period, a wave velocity and a wave direction may be measured by using a radar, the number of polar images collected by the radar may not be limited to 32, and when a new polar image is received, a first or oldest polar image may be deleted to ensure real-time dynamic image processing.

(2) A collision prevention function, a wave intensity and height measurement function and a wave motion prediction function may be associated.

(3) An existing X-band or S-band anti-collision radar is used by utilizing a radio frequency (RF) 1×2 splitter or a RF amplifier.

(4) A 6-dof motion compensated X-band wave radar, a Doppler, a time-of-flight and image overlay method are used.

6. A simulation result (by hydrodynamic and aerodynamic information) of mathematical models (including CFD, FEA and/or FSI) is applied to CDF analysis to evolve for CDF model optimization and algorithm, the analyzed and evolved result is accumulated as a look-up table in a VDR or a separate server, and the accumulated data is applied to virtual simulation to perform structure diagnosis and work evaluation.

(1) Predictive control is performed by utilizing experienced reference data.

(2) A black box function is added to configure a wire/wireless network.

(3) A corrected time tag function is added.

(4) A structure analysis algorithm function for comparing data measured by an environmental monitoring system (EMS) and a motion monitoring system (MMS) including an accumulated artificial intelligence is added.

(5) A monitoring function and a predictive controlling system processed (utilizing the resulted influence to 6-dof motion and displacement for DPS, DMS and EEOI/EEDI) by applying the algorithm with actual measurement as an artificial intelligence is stored and recorded in addition to a simple measurement monitoring function.

7. An optical & and electric extensometer, particle induced velocity (PIV), particle tracking velocity (PTV), band-pass (BP) filter energy intensity, strain gage, pressure sensor, ultrasonic measurement, and DAS-excitation and monitoring are used for hydro-elastic slamming and/or sloshing and aero-elastic fire/explosion measurement instrument.

(1) A deformation of a barrier is measured using a strain sensor and monitored by means of ultrasonic measurement or DAS-excitation for global measurement.

(2) A response of a ship barrier by a wave is measured, and a location of the measured sensor is checked to extract a wave height.

8. As a monitoring technique using a sensor (including strain, acceleration and temperature sensors) embedded in a structure, a tensioner is inserted into a structure including bridges, sewerage systems, waterworks, gas pipes, oil tubes, tunnels and structure supports, and vibration, acceleration, location, all-year or season temperature and properties (including stress or stiffness) are measured using the sensor inserted into the tensioner to diagnose safety of the structure and monitor earthquake, water leak and robbery.

9. As a leakage accident influence evaluation interpretation technique for ensuring safety of a structure or pipe exposed for a predetermined period due to another construction including subway and underground road way construction, a gas explosion damage prediction at a closed or partially opened space is interpreted using a computational fluid dynamics (CFD) theory.

What is claimed is:
1. A method for controlling an operation of a marine structure, the method comprising:
(1) accumulating, by a computer, data about an internal or external force applied to the marine structure by a fluid flow out of the marine structure by means of a linear test in a water tank or a wind tunnel, accumulating, by the computer, data about a response of the marine structure according to the internal or external force, generating by the computer, a look-up table based on the accumulated data, and storing, by the computer, the look-up table in a database;

(2) measuring, by one or more sensors, the internal or external force applied to the marine structure by using a time-of-flight method in an actual voyage of the marine structure and storing, by the computer, information relating to the internal or external force applied to the marine structure in the database;

(3) generating, by the computer, a predicted response of the marine structure to the internal or external force applied to the marine structure based on a comparison of the measured data of the internal or external force applied to the marine structure obtained in the step (2) with the accumulated data about the internal or external force applied to the marine structure obtained in the step (1); and (4) controlling, by the computer, a posture or navigation path of the marine structure in real time according to the predicted response of the marine structure to the internal or external force applied to the marine structure.

2. The method according to claim 1,
wherein the step (2) further includes (2-1) measuring at least one selected from the group consisting of a wave intensity, a wave height, a wave cycle, a wave velocity or a wave direction at a remote distance from the marine structure by using a weather measurement instrument, or storing the measurement data in the database, and
wherein the weather measurement instrument includes at least one selected from the group consisting of a wave radar, a directional wave rider, a sea level monitor, an ultrasonic displacement sensor, an amemovane or an ultrasonic wave-height meter.

3. The method according to claim 1, wherein the step (3) includes:
(3-1) measuring an actual response of the marine structure; and
(3-2) when the data about a response of the marine structure measured in the step (3-1) does not agree with the data about a response of the marine structure predicted in the step (3), correcting the data about a response of the marine structure stored in the look-up table generated in the step (1) into the data about a response of the marine structure measured in the step (3-1) or applying the corrected data to correct or supplement a numerical analysis.

4. The method according to claim 1, wherein the data about a response of the marine structure is corrected by means of a simulator based on one of a numerical model including computational fluid dynamics (CFD), finite element analysis (FEA), finite element method (FEM) and fluid structure interaction (FSI).

5. The method according to claim 1, wherein in the step (2), the internal or external force caused by fluid is measured by using a measurement instrument provided at the marine structure, and the measurement instrument is an electric sensor or an optical sensor.

6. The method according to claim 5, wherein a measurement instrument capable of measuring wind direction, wind velocity, atmospheric pressure, temperature, humidity or dust at each altitude is further provided.

7. The method according to claim 1, wherein in the step (2), the internal or external force applied to the marine structure by a fluid flow is actually measured by using an internal measurement unit (IMU).

8. The method according to claim 1, wherein in the step (3), when the marine structure is a ship, the data about a response of the marine structure includes at least one selected from the group consisting of progress direction, four-directional slopes, sea draft gauge, and trim of the ship.

9. The method according to claim 1, wherein in the step (3), when the marine structure is a temporarily fixed (stationary kept floating) structure, the data about a response of the marine structure includes at least one selected from the group consisting of moving direction, four-directional slopes and sea draft gauge of the temporarily fixed structure.

10. The method according to claim 1, wherein in the step (2), data including natural frequency, harmonic frequency or fluid characteristics of the marine structure by a fluid flow is measured, and directions and velocities of a tidal current or a sea current according to space or time are measured for each water level.

11. The method according to claim 1, wherein in the step (1), the database storing the look-up table is a voyage data recorder (VDR) provided at the marine structure.

12. The method according to claim 1, wherein when the marine structure is a temporarily fixed (stationary kept floating) structure, the look-up table is recorded as time sequential data by the year, and the look-up table is corrected by comparing with time sequential data by the year which have been accumulated till the previous year.

13. The method according to claim 1, wherein in the step (4), the posture or navigation path of the marine structure is controlled in real time by using at least one selected from the group consisting of a rudder, a thruster, a propeller, a sail, a kite or a balloon.

14. The method according to claim 1, wherein in the step (4), when the marine structure is a ship, a direction of a rudder or a RPM of a thruster or propeller is controlled according to the data about a response of the marine structure so that a resultant force of a propelling force and the internal or external force has a targeted progress direction.

15. The method according to claim 1, wherein when the marine structure is a temporarily fixed (stationary kept floating) structure, a thruster is controlled according to the predicted data about a response of the marine structure so that a resultant force of the internal or external force is minimized and the thruster maintains a current location.

16. The method according to claim 1,
wherein the marine structure includes a helideck,
wherein in the step (4), a center of gravity of the marine structure is changed by controlling a posture of the marine structure or adjusting an 6-dof angle by means of dynamic positioning (DP) or dynamic motioning (DM) so as to maintain a balance of the helideck or relieve a shock when a helicopter takes off or lands, and balanced state information of the helideck is stored in the database, and
wherein the 6-dof angle including trim is adjusted to change the center of gravity of the marine structure and maintain a balanced state so as to maintain a balance suitable for a targeted function of the marine structure.

17. The method according to claim 1,
wherein the step (2) further includes (2-1) measuring at least one selected from the group consisting of wind direction, wind velocity, temperature, humidity, atmospheric pressure, solar radiant rays, inorganic ions, carbon dioxide, dust, radioactivity or ozone at a remote distance from the marine structure by using a measurement instrument, or storing the measurement data in the database, and wherein the measurement instrument includes at least one selected from the group consisting of an anemometer, a weathervane, a hygrometer, a thermometer, a barometer, a solarimeter, an atmospheric gassol automatic collector, a $CO_2$ flux measurement instrument, an atmospheric dust collector, an air sampler or an ozone analyzer.

18. The method according to claim 1, wherein the marine structure includes a ballast tank, and sloshing restraining units are respectively provided at both sides of the ballast tank to reduce a sloshing phenomenon in the ballast tank.

19. The method according to claim 18, wherein the sloshing restraining unit restrains a sloshing phenomenon by decreasing an opening area of one horizontal section of the ballast tank.

20. The method according to claim 1,
wherein the marine structure includes a ballast tank,
wherein the ballast tank includes a barrier for partitioning an inside of the ballast tank, and
wherein an opening/closing unit is installed at the barrier to move the ballast water to another partition, and a pump is installed in the opening/closing unit to control a moving speed and a moving direction of the ballast water.

21. The method according to claim 1, wherein the measurement data of the internal or external force obtained in the step (2) is transmitted to an external weather information server, or the weather information server stores weather information correction data whose error is corrected by comparing weather information received from a satellite with the measurement data of the internal or external force.

* * * * *